(12) United States Patent
Klempf et al.

(10) Patent No.: US 10,069,969 B1
(45) Date of Patent: Sep. 4, 2018

(54) SALES INFORMATION TRANSFER SYSTEM AND METHOD

(71) Applicant: A1 Software Group Inc., Atlanta, GA (US)

(72) Inventors: Zachary Klempf, Atlanta, GA (US); Joseph Dixson, Atlanta, GA (US); Ryne Sitar, Mountain View, CA (US)

(73) Assignee: A1 Software Group Inc., Atlanta, GA (US)

( * ) Notice: Subject to any disclaimer, the term of this patent is extended or adjusted under 35 U.S.C. 154(b) by 0 days.

(21) Appl. No.: 15/953,869

(22) Filed: Apr. 16, 2018

Related U.S. Application Data

(63) Continuation of application No. 14/992,952, filed on Jan. 11, 2016.

(60) Provisional application No. 62/104,014, filed on Jan. 15, 2015.

(51) Int. Cl.
*H04M 3/436* (2006.01)
*G06Q 30/06* (2012.01)
*H04W 4/16* (2009.01)
*H04M 3/42* (2006.01)

(52) U.S. Cl.
CPC ........ *H04M 3/436* (2013.01); *G06Q 30/0623* (2013.01); *H04M 3/42042* (2013.01); *H04M 3/42068* (2013.01); *H04W 4/16* (2013.01); *H04M 3/42382* (2013.01)

(58) Field of Classification Search
CPC ............ H04M 3/436; H04M 3/42042; H04M 3/42059; H04M 3/42068
See application file for complete search history.

(56) References Cited

U.S. PATENT DOCUMENTS

| | | | |
|---|---|---|---|
| 2002/0166119 A1 | 11/2002 | Cristofalo | |
| 2006/0088144 A1* | 4/2006 | Mitchell | G06Q 10/10 379/88.17 |
| 2008/0304642 A1 | 12/2008 | Hiraishi et al. | |
| 2014/0149884 A1 | 5/2014 | Flynn, III et al. | |
| 2014/0302829 A1* | 10/2014 | Won | H04M 3/436 455/415 |
| 2015/0347630 A1* | 12/2015 | Li | G06Q 10/0833 707/722 |
| 2016/0212262 A1 | 7/2016 | Klempf et al. | |

* cited by examiner

*Primary Examiner* — Omoniyi Obayanju
(74) *Attorney, Agent, or Firm* — Levine Bagade Han LLP

(57) ABSTRACT

An information transfer system and method are disclosed. When a call is received on a mobile device, the application on the mobile device can search local databases and server databases for a number associated with the caller. If there is a match in the local database or server databases, the information associated with the number can be copied into temporary folders. The information in the temporary folders can be displayed on the mobile device.

20 Claims, 35 Drawing Sheets

SALES INFORMATION TRANSFER SYSTEM AND METHOD

CROSS-REFERENCE TO RELATED APPLICATIONS

This application is a continuation of U.S. patent application Ser. No. 14/992,952 filed Jan. 11, 2016 which claims benefit of priority to U.S. Provisional Application No. 62/104,014 filed Jan. 15, 2015, which is herein incorporated by reference in its entirety.

BACKGROUND OF THE INVENTION

1. Field of the Invention

An information transfer system and method are disclosed. The system and method relate to customer relationship management (CRM) software.

2. Description of the Related Art

Currently, automobile dealerships use desktops to store and look up client information, track inventory, and schedule appointments. This requires the sales representative to enter the dealership and login to a computer to find such information which is not efficient. Moreover, when a sales representative receives a call, it may be difficult for the sales representative to remember each client and the relevant, important information related to each client.

A mobile device able to receive client information is desired. With this device, relevant customer data will display on the screen when a call is received from a matching profile, even if the customer is not added in the phone contact directory. Depending on what stage the client is in of the sales process, specific data will be included in the pop up notes on the mobile device. For example, if an existing client has purchased a car, different data will be shown in the pop up notes than if the client just went for a test drive.

There can be two versions of the sales information transfer application. There can be a dealership version and a sales representative version. The dealership version is connected to remote servers and also uses local severs to provide the desired information. The sales representative version for an individual or independent sales representative uses local servers.

BRIEF SUMMARY OF THE INVENTION

A method for sales information transfer. The method can store a first set of user information on a first mobile device database. The first mobile device database can be on a first mobile device. The method can store a second set of user information on a local server database. The method can store a third set of user information on a remote server database. The method can receive a call from a second mobile device, wherein the call is received by the first mobile device. The method can search the mobile device database for the first set of user information of the user when the call is received. The user information can have at least a second mobile device identifier of the second mobile device. The method can search the local server database for the second set of user information when the call is received. The method can search the remote server database for the third set of user information when the call is received. The method can receive at least one of the first, second, or third set of user information if the respective set of user information is found. The user information can be received by the first mobile device. The method can display the sets of information associated with the second mobile device identifier received by the first mobile device on a display of the first mobile device when the call is received.

A method for sales information transfer. The method can request user information from a server by a requesting first mobile device. The first mobile device can be associated with a first mobile device identifier. The method can search the server for the user information, wherein the user information can have a stored mobile device identifier. The method can compare the stored mobile device identifier with the first mobile device identifier. The comparing can be performed by the server. When the first mobile device identifier is not the same as the stored mobile device identifier, the method can generate a notification to the first mobile device, a second mobile device associated with the stored mobile device identifier, and a third mobile device.

A system for sales information transfer. The system can have a mobile device comprising a mobile device database. The mobile device database can be configured to store user information. The user information can have a mobile device identifier. The system can have a local server comprising a local server database. The local server database can be configured to store the user information. The mobile device can be configured to receive a client profile associated with the user information if the user information is found. The mobile device can be configured to display the user information on a display of the mobile device if the user information is found. The mobile device can be configured to display the user information when the mobile device receives a call. The client profile can be based on a stage of purchasing an automobile.

DETAILED DESCRIPTION

Figure 1:
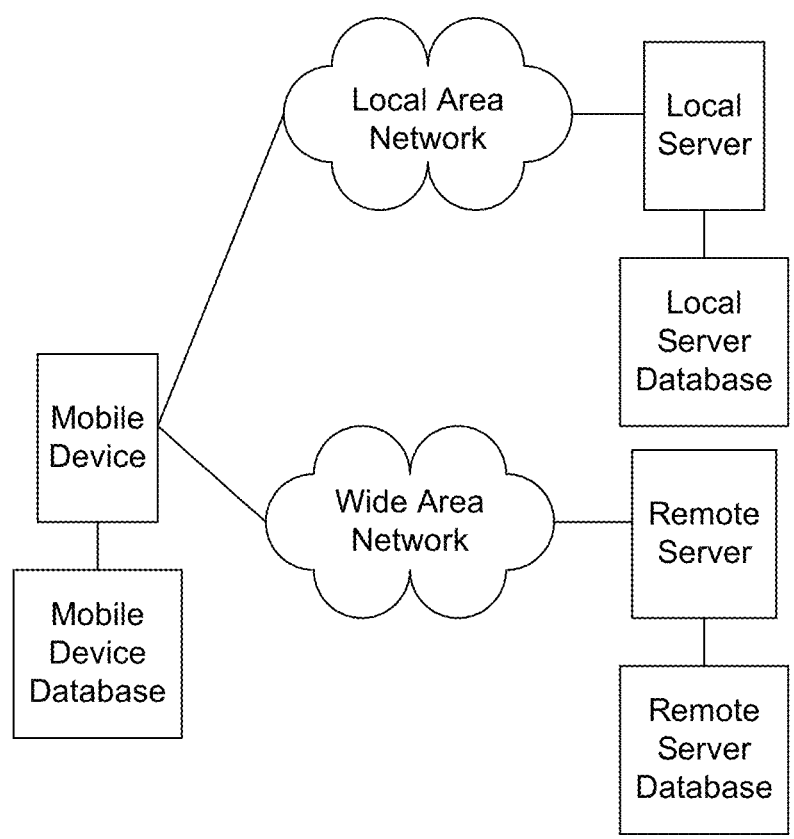
FIG. 1 illustrates a variation of components in a sales information transfer system with a local server and a remote server.

FIG. 1 illustrates that the sales information transfer system can have at least one, two, or three mobile devices, at least one, two, or three local servers, at least one, two, or three remote servers, or any combination thereof. The thin lines can represent connections between components. The lines can represent information/data transfers in either direction. The lines can be hardwired, wireless, or any combination thereof.

The mobile device can be, but is not limited to, a laptop, a desktop, a computer, a tablet, or a cellular phone. The mobile device can have a mobile device database. The mobile device database can be located within the mobile device or on the exterior of the mobile device. The mobile device database can be connected to the mobile device. The mobile device database can store information such as client information, deal information associated with clients, appointment information associated with clients, any other information related to the client, or any combination thereof.

Client information can include, but is not limited to, first name, last name, address, phone, email, source, birthday, notes, sales representative's name, or any combination thereof. Deal information can include, but is not limited to, the client information, vehicle of interest, vehicle identification number (VIN), stock number, year, make, model, mileage, price, color, notes, trade-in information, or any combination thereof. Trade-in information can include, but is not limited to, VIN, year, make, model, mileage, value, payoff (debt), color, notes, or any combination thereof. Appointment information can include, but is not limited to, date, time, location, notes about an appointment, deal/deal information, or any combination thereof.

The mobile device can be connected to a local server via a local area network (LAN). The local server can have a local server database. The local server database can store information such as client information, deal information, appointment information, any other information, or any combination thereof. The local server database can be located within the server or on the exterior of the server.

The mobile device can be connected to a remote server via a wide area network (WAN). The remote server can have a remote server database. The remote server database can store information such as client information, deal information, appointment information, any other information, or any combination thereof. The remote server database can be located within the server or on the exterior of the server.

Figure 2:
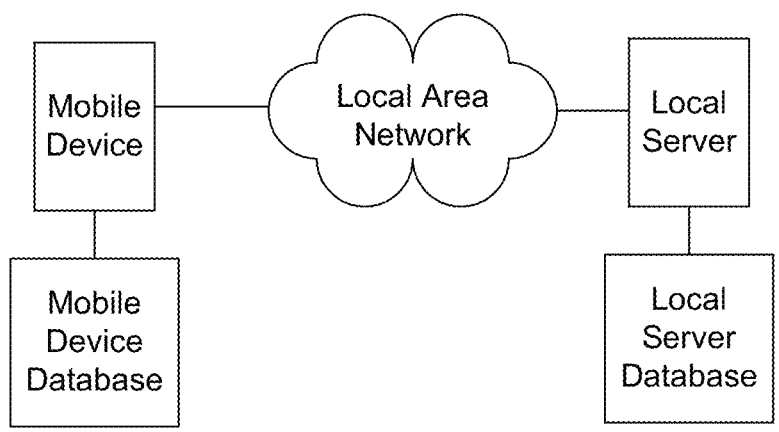
FIG. 2 illustrates a variation of components in a sales information transfer system with a local server.

FIG. 2 illustrates that the mobile device can be connected to a local server via LAN.

Figure 3:
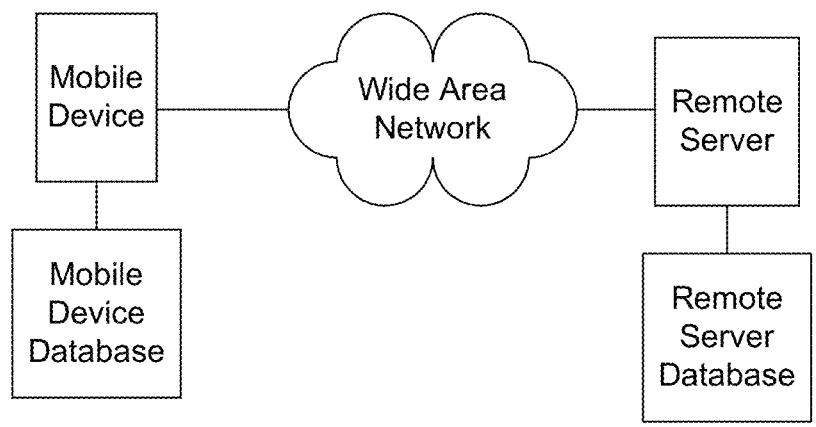
FIG. 3 illustrates a variation of components in a sales information transfer system with a remote server.

FIG. 3 illustrates that the mobile device can be connected to a remote server via WAN.

Figure 4:
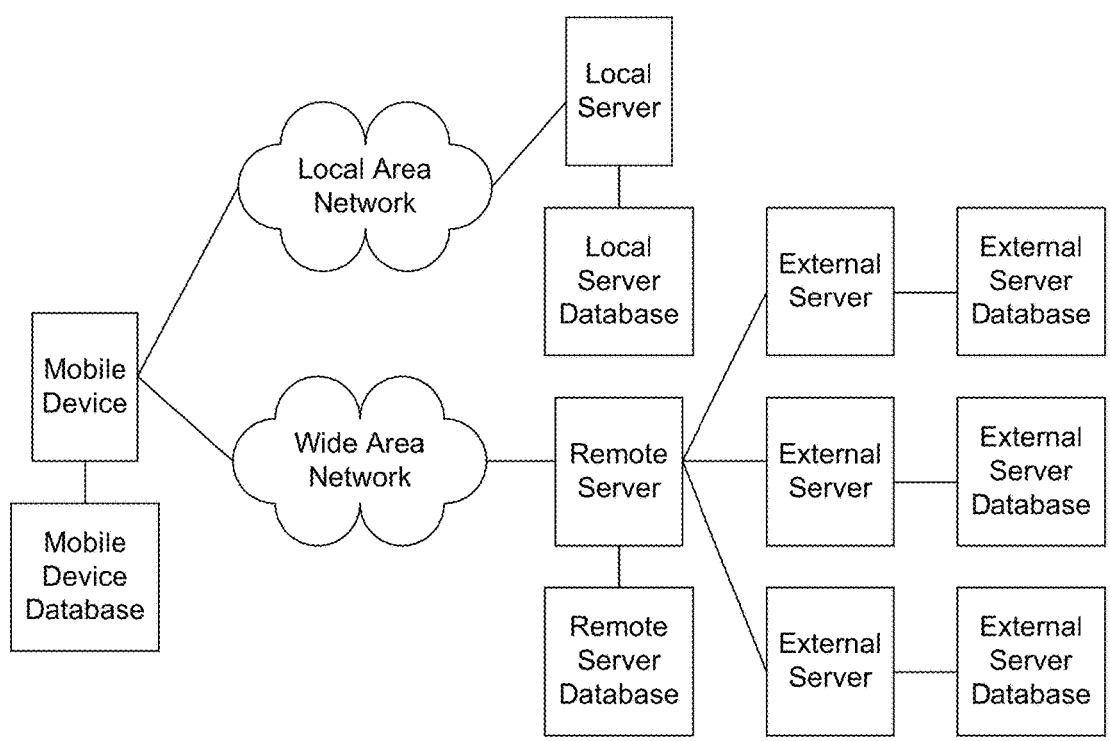
FIG. 4 illustrates a variation of components in a sales information transfer system with a local server and remote server connected to external servers.

FIG. 4 illustrates that the mobile device can be connected to the local server via LAN. The mobile device can be connected to the remote server via WAN. The remote server can be connected to at least one, two, three or more external servers via LAN, WAN, hardwire, wireless, or any combination thereof. The external server can have an external server database. The external server database can store information such as client information, deal information, appointment information, any other information, or combinations thereof. The external server database can be located within the server or on the exterior of the server.

Figure 5:
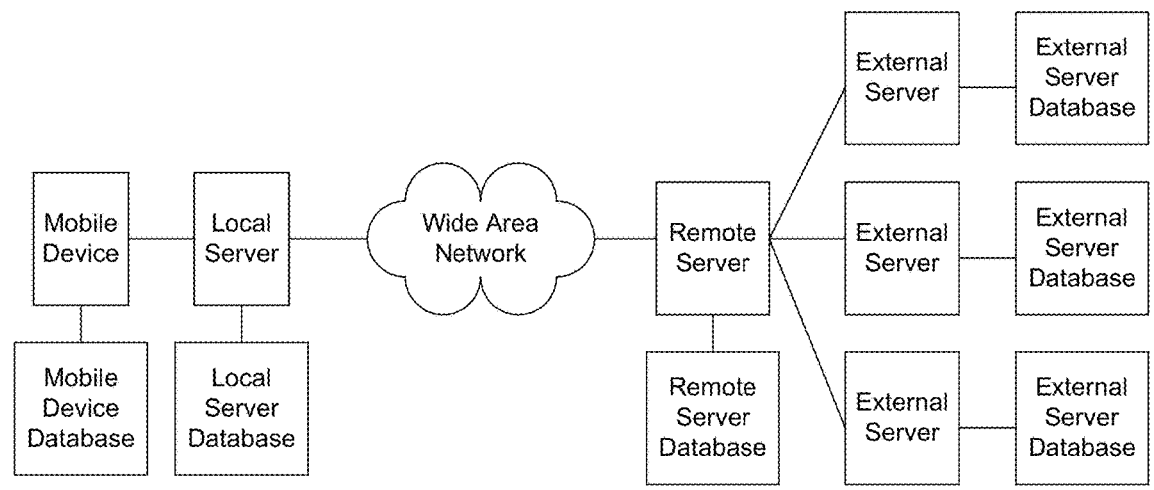
FIG. 5 illustrates a variation of components in a sales information transfer system with a local server, a remote server, and external servers.

FIG. 5 illustrates that the mobile device can be connected to a local server. The local server can be connected to a remote server via WAN. The remote server can be connected to external servers via WAN, LAN, or any combination thereof.

Figure 6:
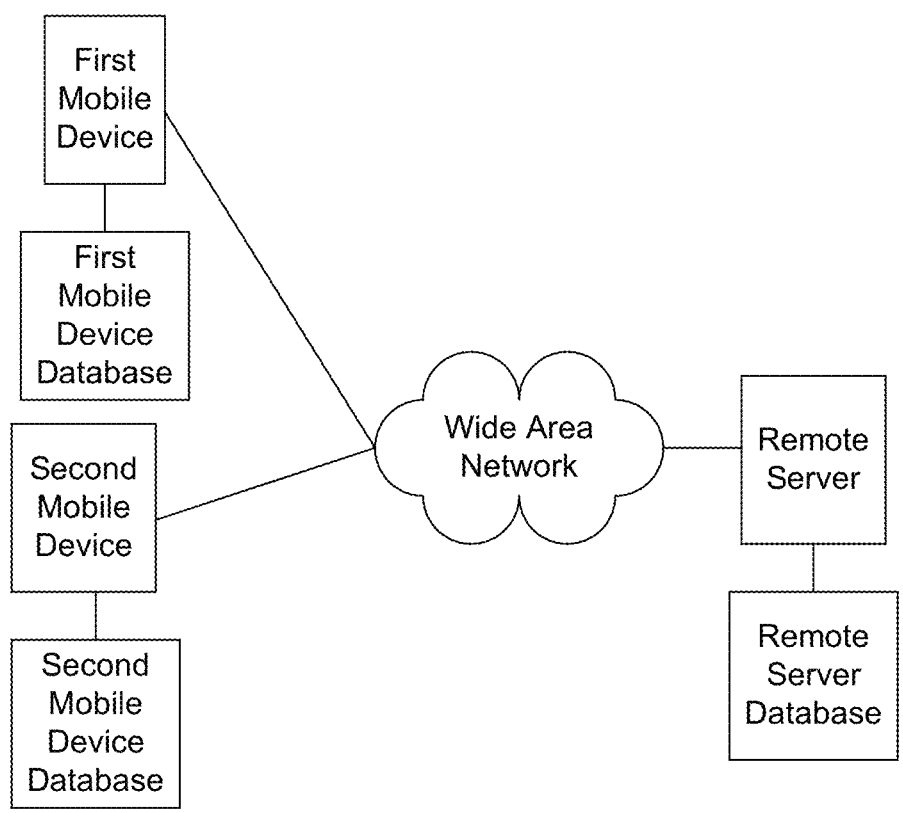
FIG. 6 illustrates a variation of components in a sales information transfer system with multiple mobile devices.

FIG. 6 illustrates that a first mobile device can be connected to a remote server via WAN. The first mobile device can be connected to a local server via LAN. A second mobile device can be connected to the same remote server or a different remote serve via WAN. The second remote server can be connected to the same local server or a different local server via LAN.

Figure 7A:
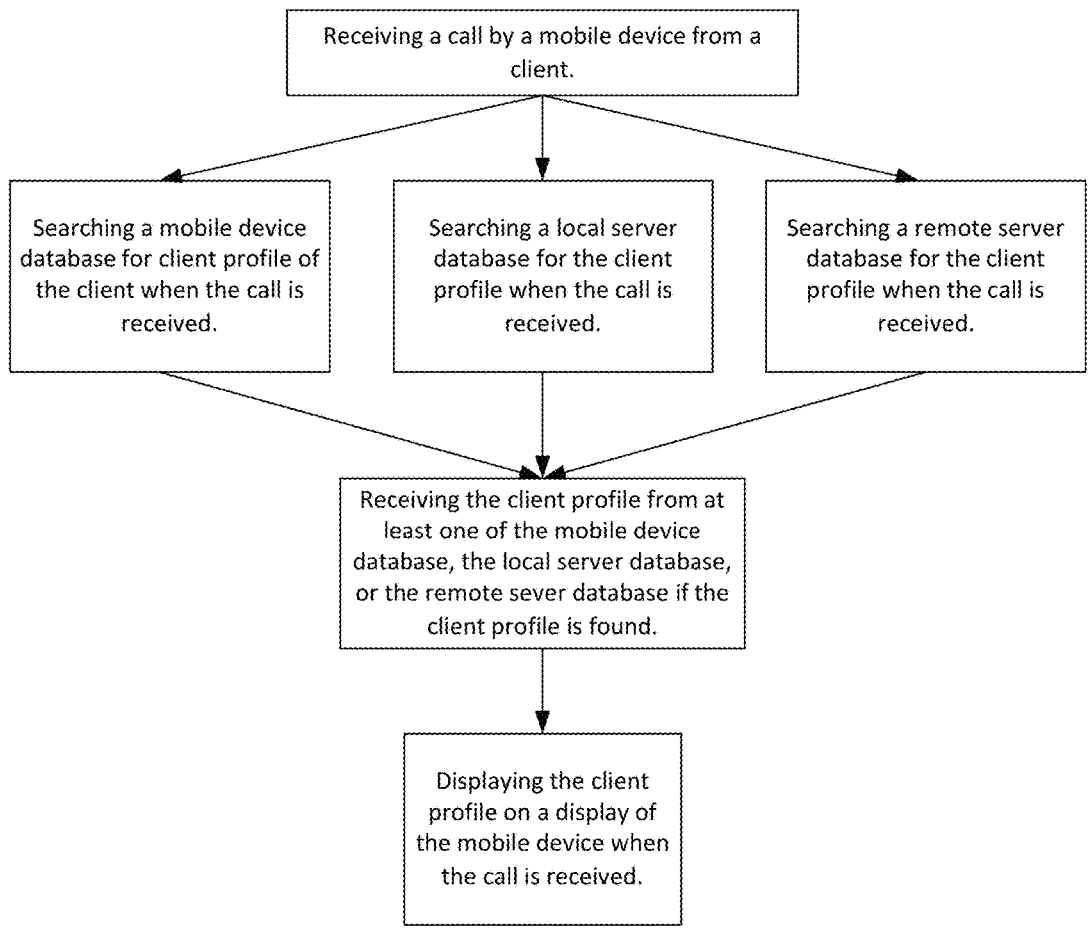
FIG. 7*a* illustrates a variation of a sales information transfer method.

FIG. 7a illustrates that an application can commence when the mobile device receives a call from a client (i.e., a second mobile device). The application can run in the background of the mobile device. When the mobile device receives a call from a client, the mobile device (i.e., the application) can search the mobile device database for a client profile of the client, the mobile device can request that the local server search the local server database for the client profile, the mobile device can request that the remote server search the remote server database for the client profile, or any combination thereof. The request to search the mobile or server databases can occur at different times or at the same time. When the mobile device database, the local server database, the remote server database, or any combination thereof searches for the client profile, the mobile device can receive the client profile from the mobile device database, the local server database, the remote server database, or any combination thereof if the client profile is found. If the client profile is not found, no action can be taken or a new client profile can be created. When the mobile device receives the client profile, the mobile device can display the client profile (or a subset of the client profile) on the mobile device. The displaying of the client profile on the mobile screen can be a pop up note. The displaying of the client profile can be for the duration of the call, when the mobile device rings, after the call, before receiving the call, when receiving a text message, when receiving an email, or any combination thereof.

For example, the user can receive a call from a client on a mobile device. The application can search local and server databases for a phone number and/or profile match based on the phone number or profile extracted from the call received by the user. If there is a match in the local system or server databases, the pop up note feature of an application can be enabled. Depending on what stage the client is in, the application can display specific information that can be included on the pop up note on the screen of the mobile device.

Figure 7B:
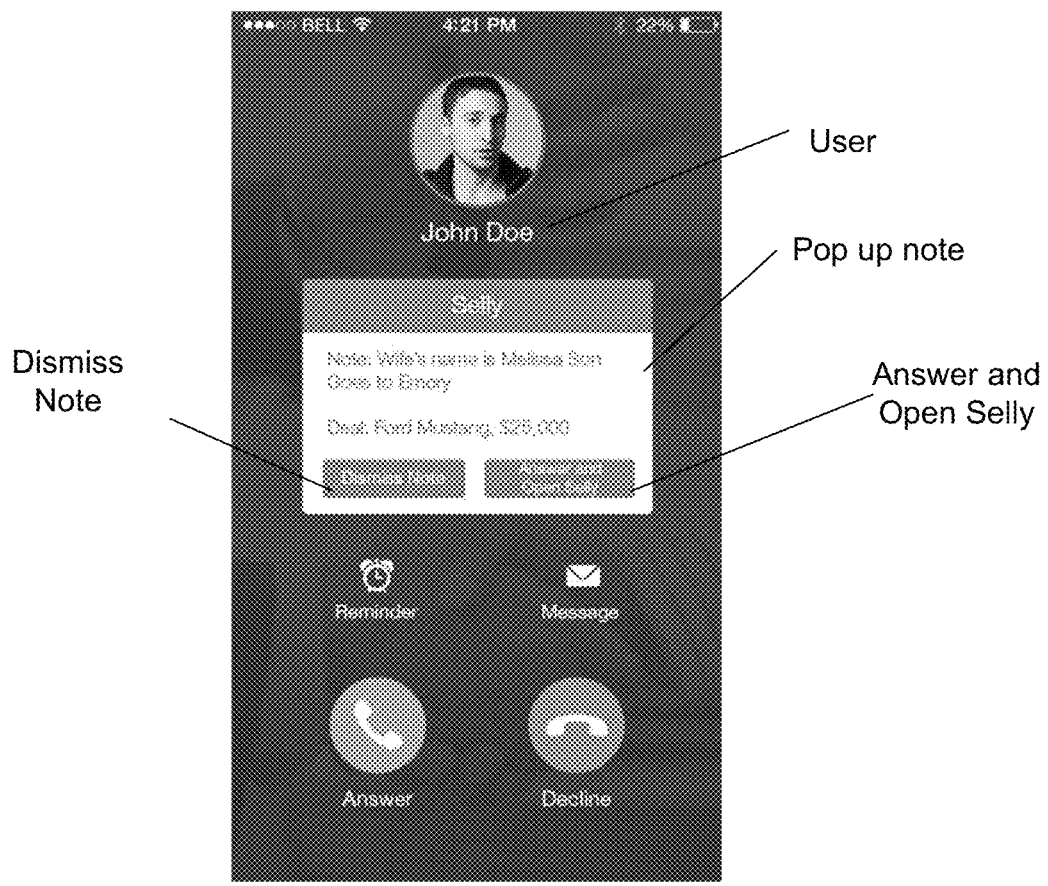
FIG. 7*b* illustrates a variation of a display of a pop up note.
Figure 7C:
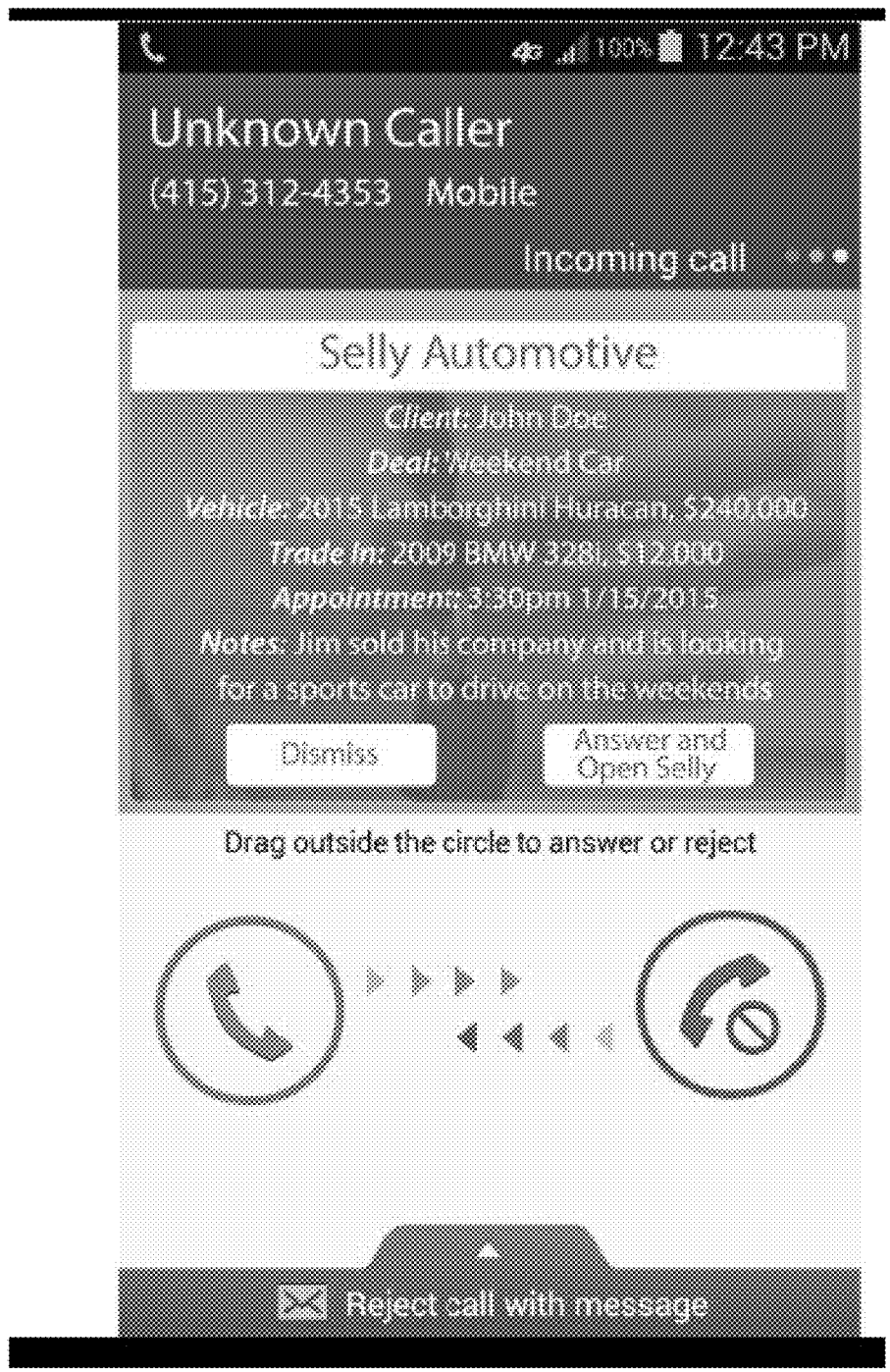
FIG. 7*c* illustrates a variation of a display of a pop up note.

FIGS. 7B and 7C illustrate a pop up note (i.e., client profile notes) that can be displayed on the device. The application can display the pop up note. The information on the pop up note can be found on the mobile device, the local server, the remoter server, or any combination thereof. FIG. 7b illustrates that the pop up note can include a dismiss note button, an answer and open Selly button, client notes (e.g., client information, deal information, appointment information, or any combination thereof), application name, or any combination thereof. The pop up note can be displayed on the entire screen of the device or on a portion of the screen of the device.

FIG. 7C illustrates another variation of the pop up note. The pop up note can include a drag outside the circle to reject or answer the call where the user must move his/her hands/fingers across the screen to answer or reject the call, rejecting a call with a message, or any combination thereof. The user can open the application or answer the call via voice command. The pop up note can be displayed on the top, bottom, or side of the device screen.

Figure 8:
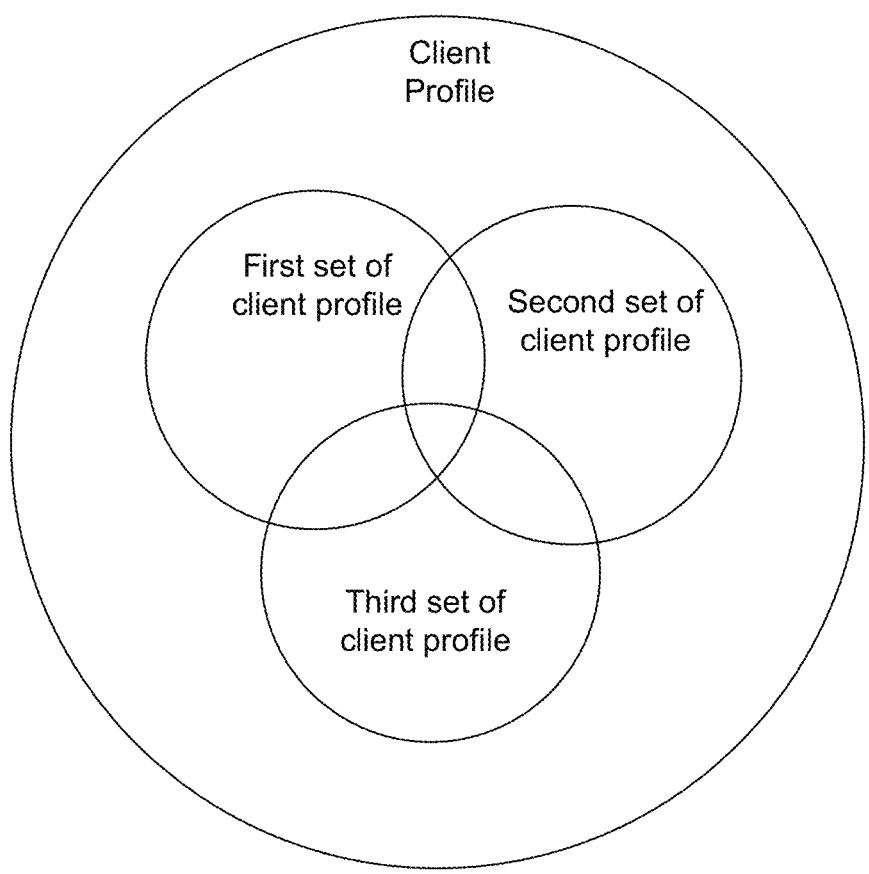
FIG. 8 illustrates a variation of the types of information.

FIG. 8 illustrates the various subsets of information. The client profile can include the client information, the deal information, the appointment information, any other information related to the client, or any combination thereof. The client profile can have a first, second, third, fourth, or more subsets of information. Each subset of information can include the client information, the deal information, the appointment information, any other information related to the client, or any combination thereof. The subsets of client profile information can overlap with one another.

Figure 9:
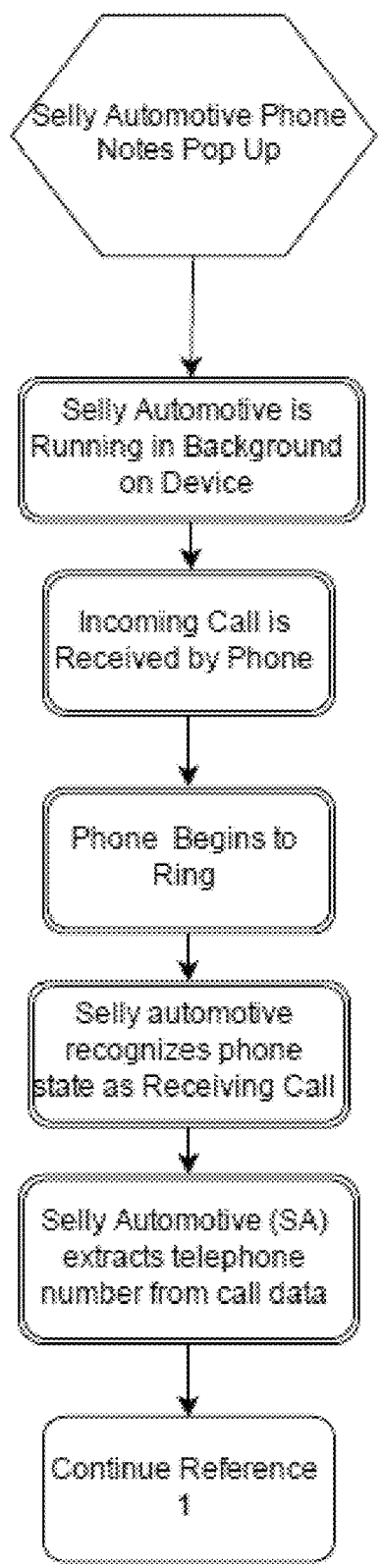
FIGS. 9-17 illustrate a variation of a flowchart of the sales information transfer system.

FIG. 9 illustrates that when the Selly Automotive Application (Application) is running in the background on the first device, the first mobile device can receive an incoming notification (e.g., a call or a text) by a second mobile device. When the incoming call is received by the mobile device, the mobile device can begin to ring or vibrate. When the mobile device begins to ring, the application can recognize a mobile device state, for example, Receiving Call. When the application recognizes the mobile device state, the application can extract a number (e.g., telephone number, name, or email address) from the call data of the mobile device.

Figure 10:
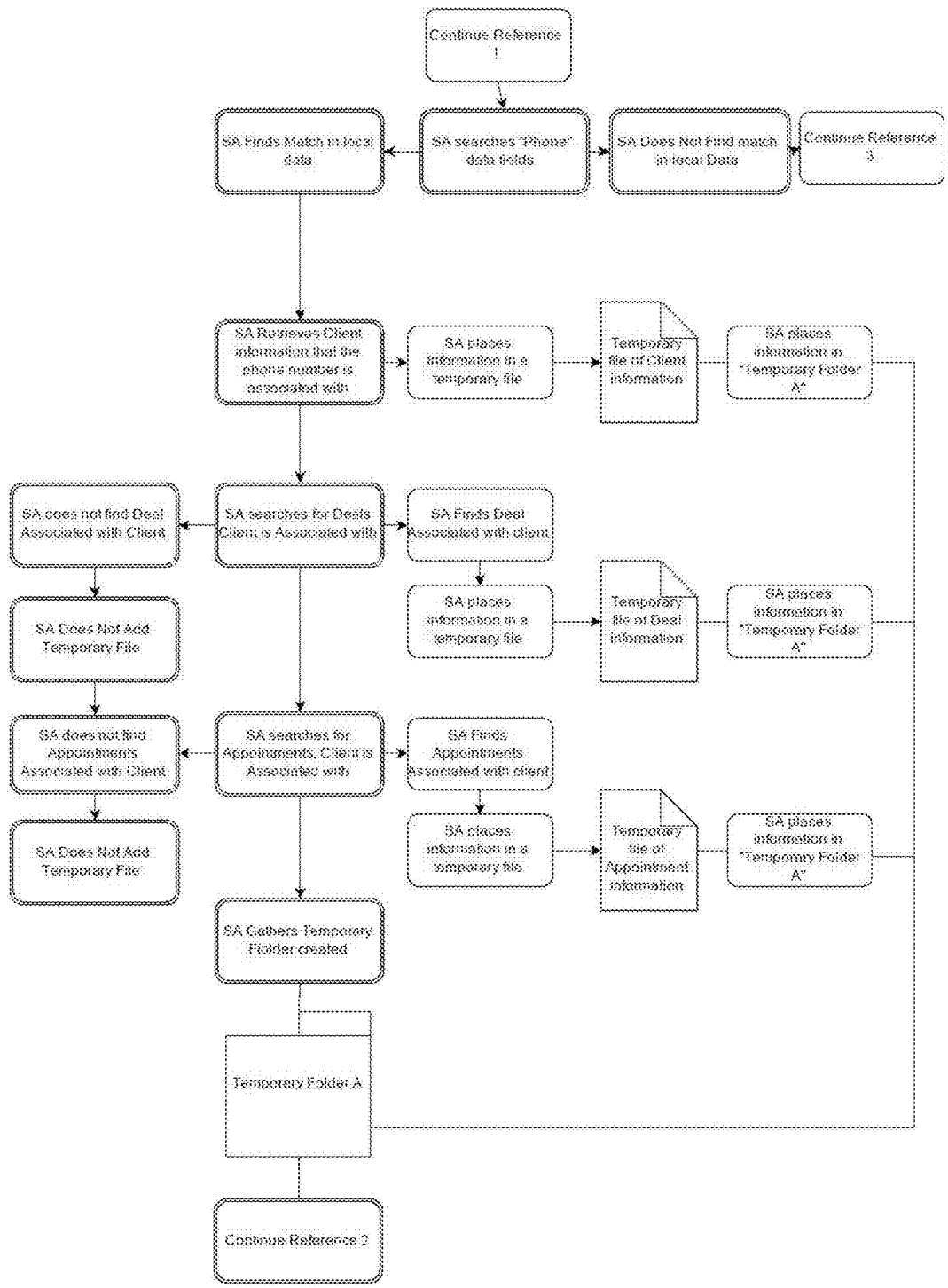

FIG. 10 illustrates that when the application extracts the number from the call data of the mobile device, the application can search "Phone" data fields (or any other data fields of the mobile device). When the application searches "Phone" data fields, the application can find a match in local data (i.e., mobile device database).

If the application finds a match in local data, the application can retrieve client information associated with the number. When the application retrieves client information associated with the number, the application can place the information in a temporary file, for example, temporary file of client information (e.g., client information file). When the application places the information in a temporary file, the application can place the information in a temporary folder, for example, temporary folder A. When or after the application retrieves client information associated with the number, the application can search for deals associated with the client. If the application does not find deals associated with the client, the application may not add a temporary file. If the application finds deals associated with the client, the application can place the information in a temporary file, for example, temporary file of deal information (e.g., deal information file). The temporary file of deal information can be placed in a temporary folder, for example, temporary folder A. When or after the application searches for deals associated with the client, the application can search for appointments associated with the client. If the application does not find appointments associated with the client, the application may not add a temporary file. If the application finds appointments associated with the client, the application can place the information in a temporary file, for example, temporary file of appointment information (e.g., appointment information file). The temporary file of appointment information can be placed in a temporary folder, for example, temporary folder A. After the application searches for appointments, the application can gather the temporary folder created (i.e., temporary folder A).

Figure 11:
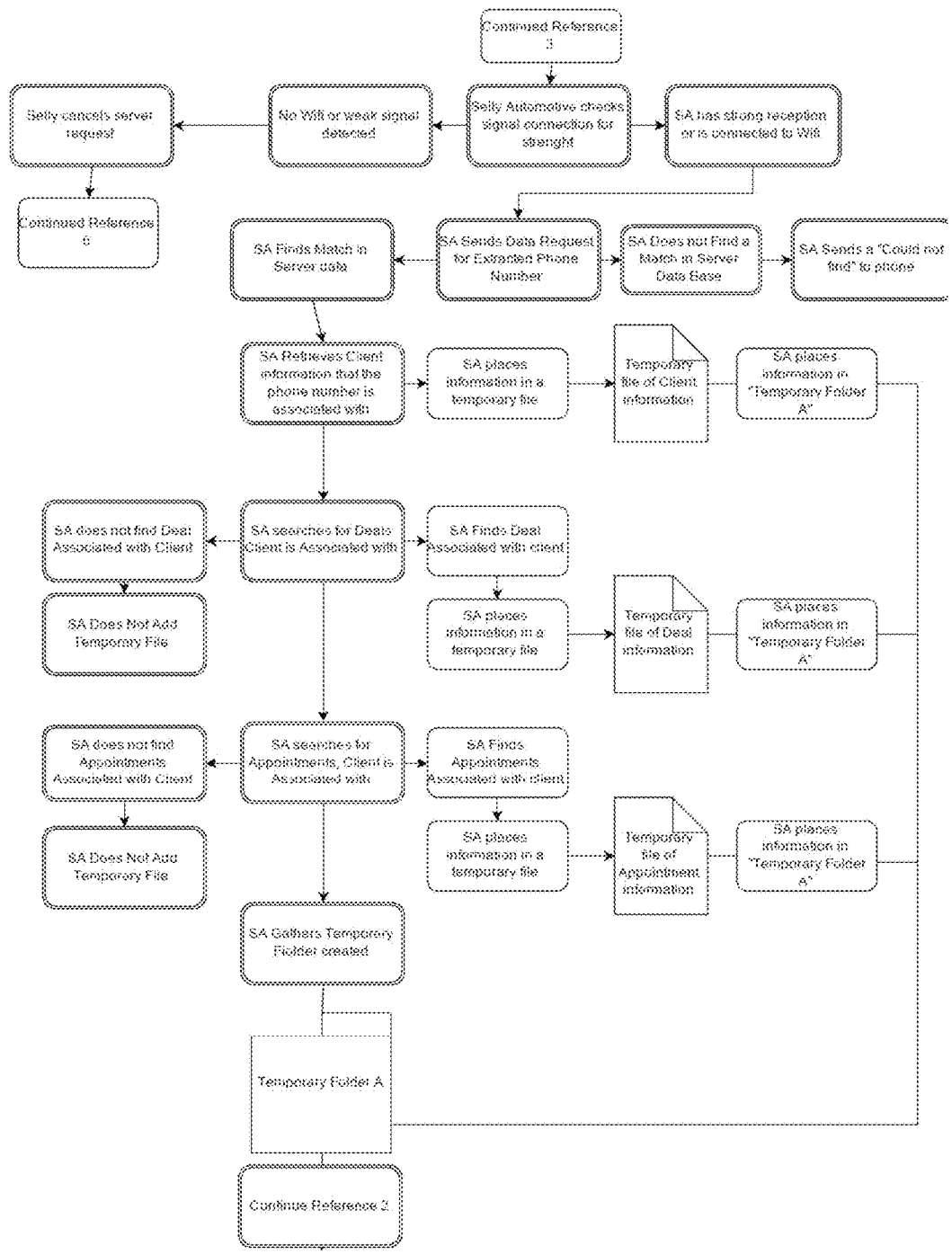

FIG. 11 illustrates that if the application does not find a match in local data, the application checks for signal connection for strength. If there is no WIFI or weak signal detected, the application can cancel the server request (e.g., server request can be for local servers connected via LAN, remote servers connected via WAN, server located on or near the mobile device, or any combination thereof). If the application detects strong reception or connected to WIFI, the application can send data request for the extracted number. If the application does not find a match in the server database, the application can send a notification to the mobile device, for example, "could not find." The notification can be displayed on the mobile device screen.

If the application finds a match in the server data, the application can retrieve client information associated with the number. When the application retrieves client information associated with the number, the application can place the information in a temporary file, for example, temporary file of client information. When the application places the information in a temporary file, the application can place the information in a folder, for example, temporary folder A. When or after the application retrieves client information associated with the number, the application can search for deals associated with the client. If the application does not find deals associated with the client, the application may not add a temporary file. If the application finds deals associated with the client, the application can place the information in a temporary file, for example, temporary file of deal information. The temporary file of deal information can be placed in a temporary folder, for example, temporary folder A. When or after the application searches for deals associated with the client, the application can search for appointments associated with the client. If the application does not find appointments associated with the client, the application may not add a temporary file. If the application finds appointments associated with the client, the application can place the information in a temporary file, for example, temporary file of appointment information. The temporary file of appointment information can be placed in a temporary folder, for example, temporary folder A. After the application searches for appointments, the application can gather the temporary folder created (i.e., temporary folder A).

Figure 12A:
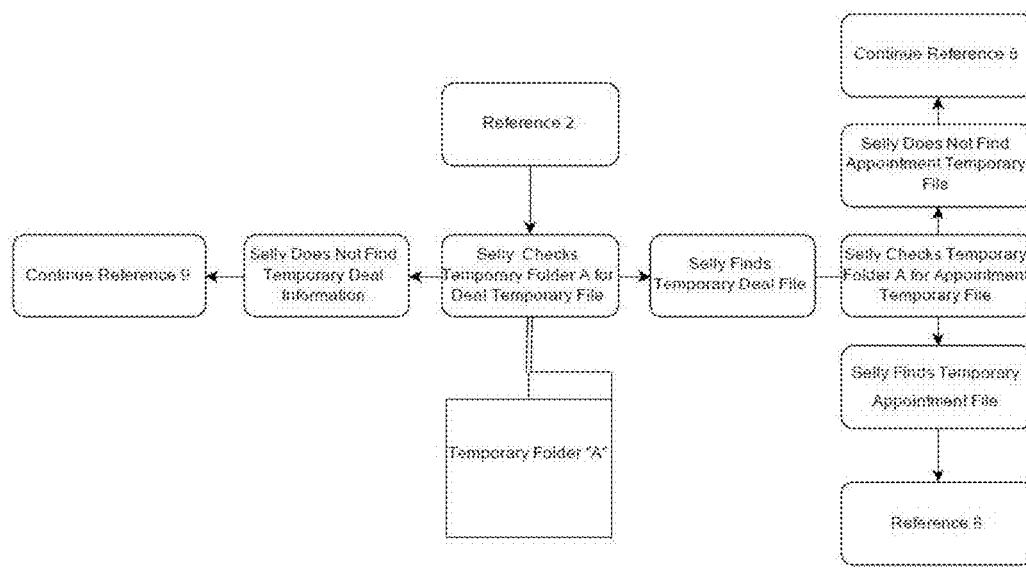
Figure 12B:
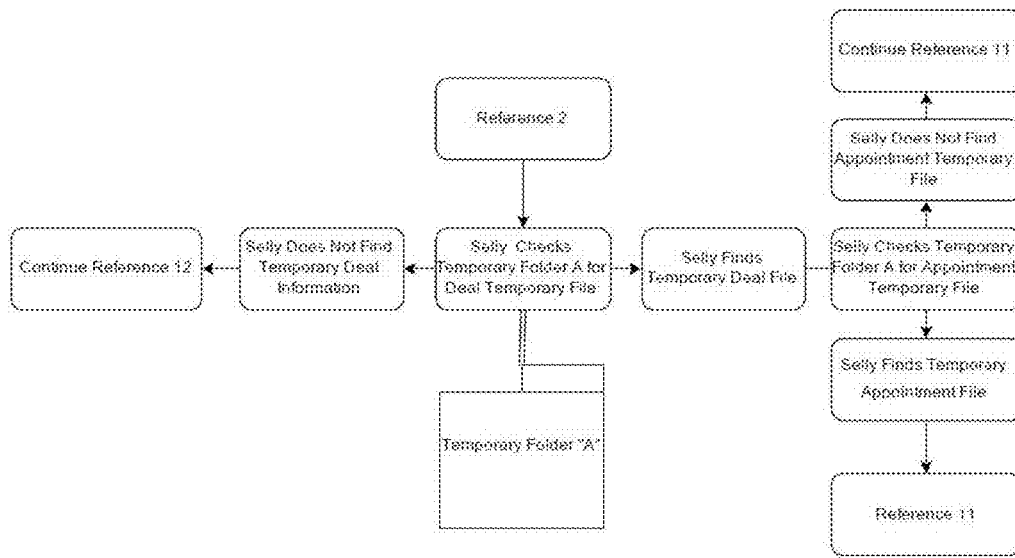

FIGS. 12A and 12B illustrate that when the application gathers the temporary folder (i.e., temporary folder A), the application can check the temporary folder for temporary file of deal information. If the application finds the temporary file of deal information, the application can check the temporary folder A for the temporary file of appointment information.

Figure 13A:
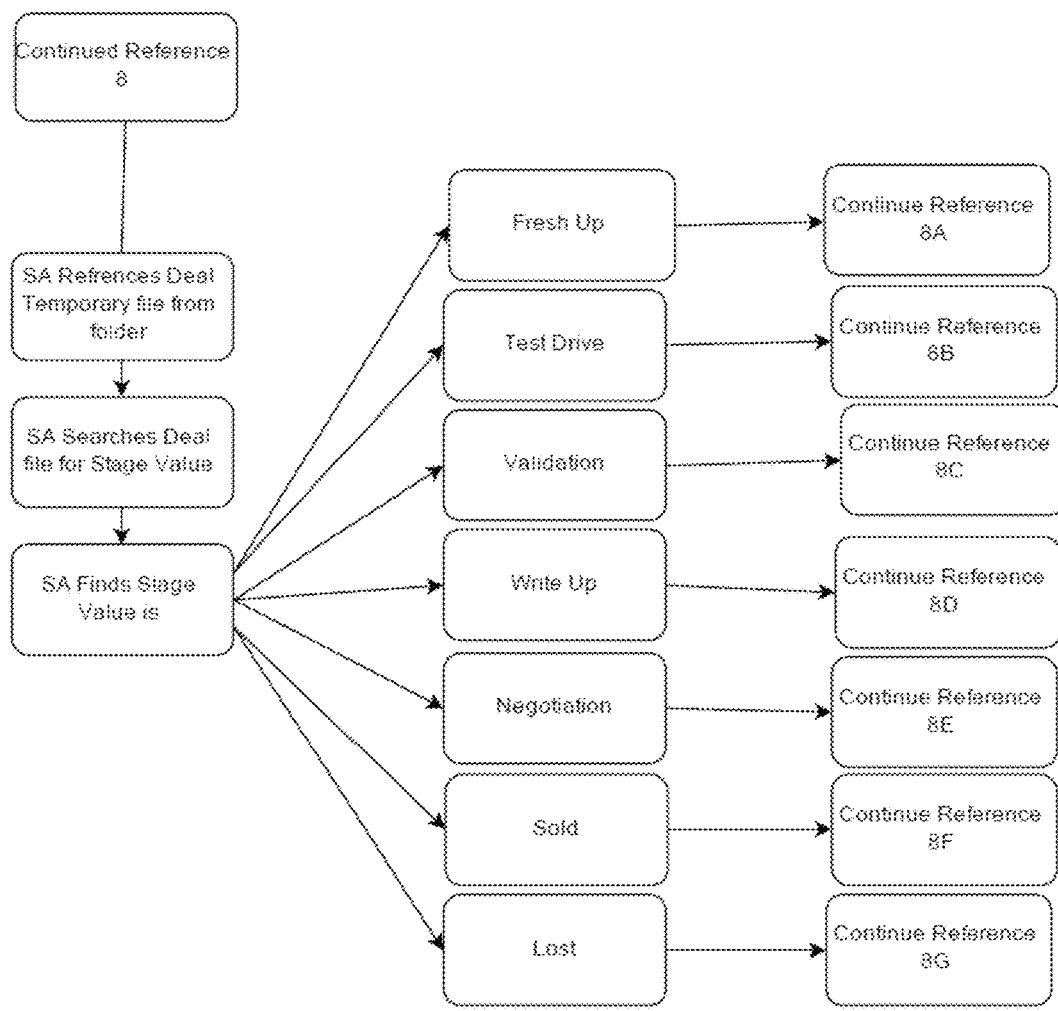

FIG. 13A illustrates that when the application finds/does not find the temporary file of appointment information, the application can reference the deal information file from the temporary folder. When the application references the deal information file from the temporary folder, the application can search the deal information file for a stage value. The stage values can be, but is not limited to, fresh up, test drive, validation, write up, negotiation, sold, lost, or any combination thereof. The stage value can be any value the client, user, or person inputs. The stage value can be selected manually by the user. The stage value can be selected automatically by the application. The stage value can be any value that represents a stage during the automobile purchase process.

"Fresh Up" can be a car dealer term for a new customer, someone who has walked on the lot and is a potential customer. "Test Drive" can be the stage where the client sees the car and test drives it on a road to assess the way the vehicle preforms. "Validation" can be when the salesman inquires about whether the customer likes the vehicle and would like to see a price statement or look at another car. "Write Up" can be when the salesman provides the initial quote on the car's price. "Negotiation" can be the stage where the client and salesman try to come to an agreement on the car's value. "Sold" can be when the client and the salesman come to an agreement on price and the client pays for the car and accepts ownership. "Lost" can be when the client and the salesman fail to come to an agreement about the price/value of the car, and the client leaves the dealership without the intent to return.

Figure 13B:
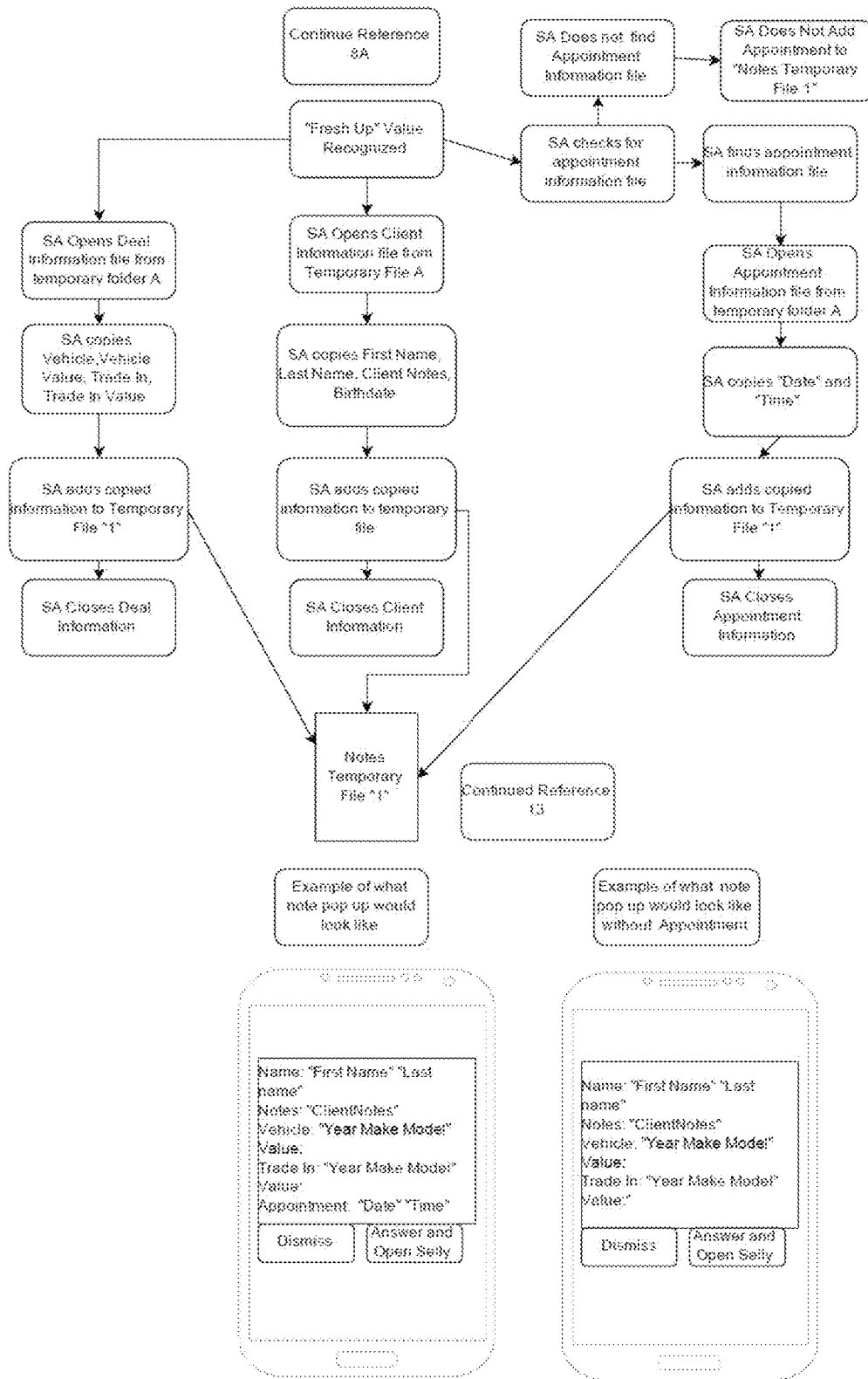

FIG. 13B illustrates that when the stage value is fresh up, the application can open the deal information file from the temporary folder. When the application opens the deal information file from the temporary folder, the application can copy information such as vehicle, vehicle value, trade in, trade in value, or any combination thereof. When the application copies the information, the application can add the copied information to a notes temporary file, for example, notes temporary file 1. When the application adds the copied information to the notes temporary file, the application can close the deal information file.

When the stage value is fresh up, the application can open the client information file from the temporary folder. When the application opens the client information file, the application can copy information such as first name, last name, middle name, client notes, birthdate, or any combination thereof. When the application copies the information, the application can add the copied information to a notes temporary file, for example, notes temporary file 1. When the application adds the copied information to the notes temporary file, the application can close the client information file.

When the stage value is fresh up, the application can check for the appointment information file. If the application does not find the appointment information file, the application may not add appointments to the notes temporary file. If the application finds the appointment information file, the application can open the appointment information file from the temporary folder. When the application opens the appointment information file, the application can copy information such as date, time, or any combination thereof. When the application copies the information, the application can add the copied information to a notes temporary file, for example, notes temporary file 1. When the application adds the copied information to the notes temporary file, the application can close the appointment information file.

The copied information from the deals information file, the client information file, and/or the appointment information file can be copied to an intermediate temporary file before being added to the notes temporary file. The copied information from the deals information file, the client information file, and/or the appointment information file can be in one notes temporary file or multiple notes temporary files.

Figure 13C:
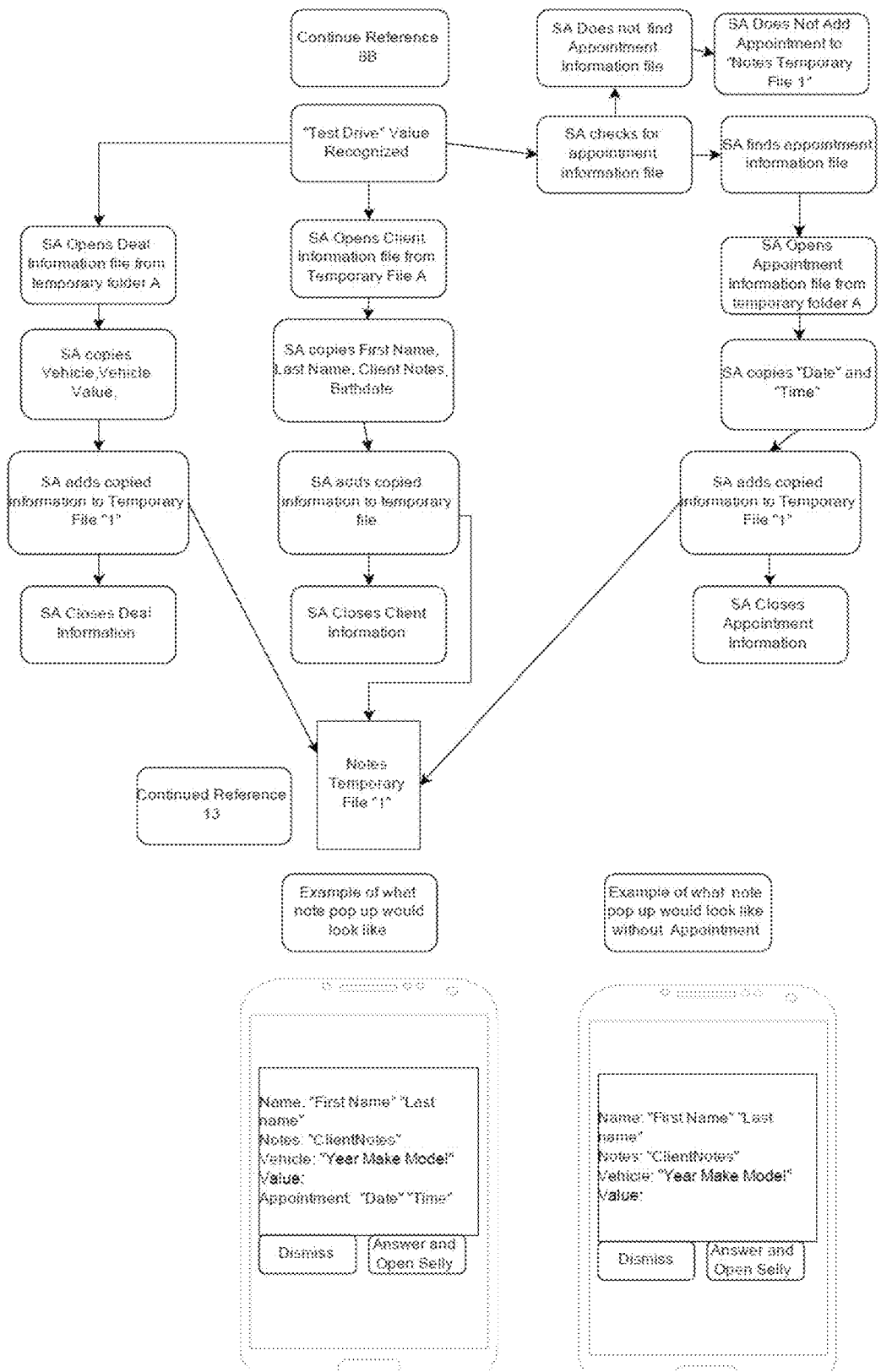

FIG. 13C illustrates that when the stage value is test drive, the application can open the deal information file from the temporary folder. When the application opens the deal information file from the temporary folder, the application can copy information such as vehicle, vehicle value, or any combination thereof. When the application copies the information, the application can add the copied information to a notes temporary file, for example, notes temporary file 1. When the application adds the copied information to the notes temporary file, the application can close the deal information file.

When the stage value is test drive, the application can open the client information file from the temporary folder. When the application opens the client information file, the application can copy information such as first name, last name, middle name, client notes, birthdate, or any combination thereof. When the application copies the information, the application can add the copied information to a notes temporary file, for example, notes temporary file 1. When the application adds the copied information to the notes temporary file, the application can close the client information file.

When the stage value is test drive, the application can check for the appointment information file. If the application does not find the appointment information file, the application may not add appointments to the notes temporary file. If the application finds the appointment information file, the application can open the appointment information file from the temporary folder. When the application opens the appointment information file, the application can copy information such as date, time, or any combination thereof. When the application copies the information, the application can add the copied information to a notes temporary file, for example, notes temporary file 1. When the application adds the copied information to the notes temporary file, the application can close the appointment information file.

Figure 13D:
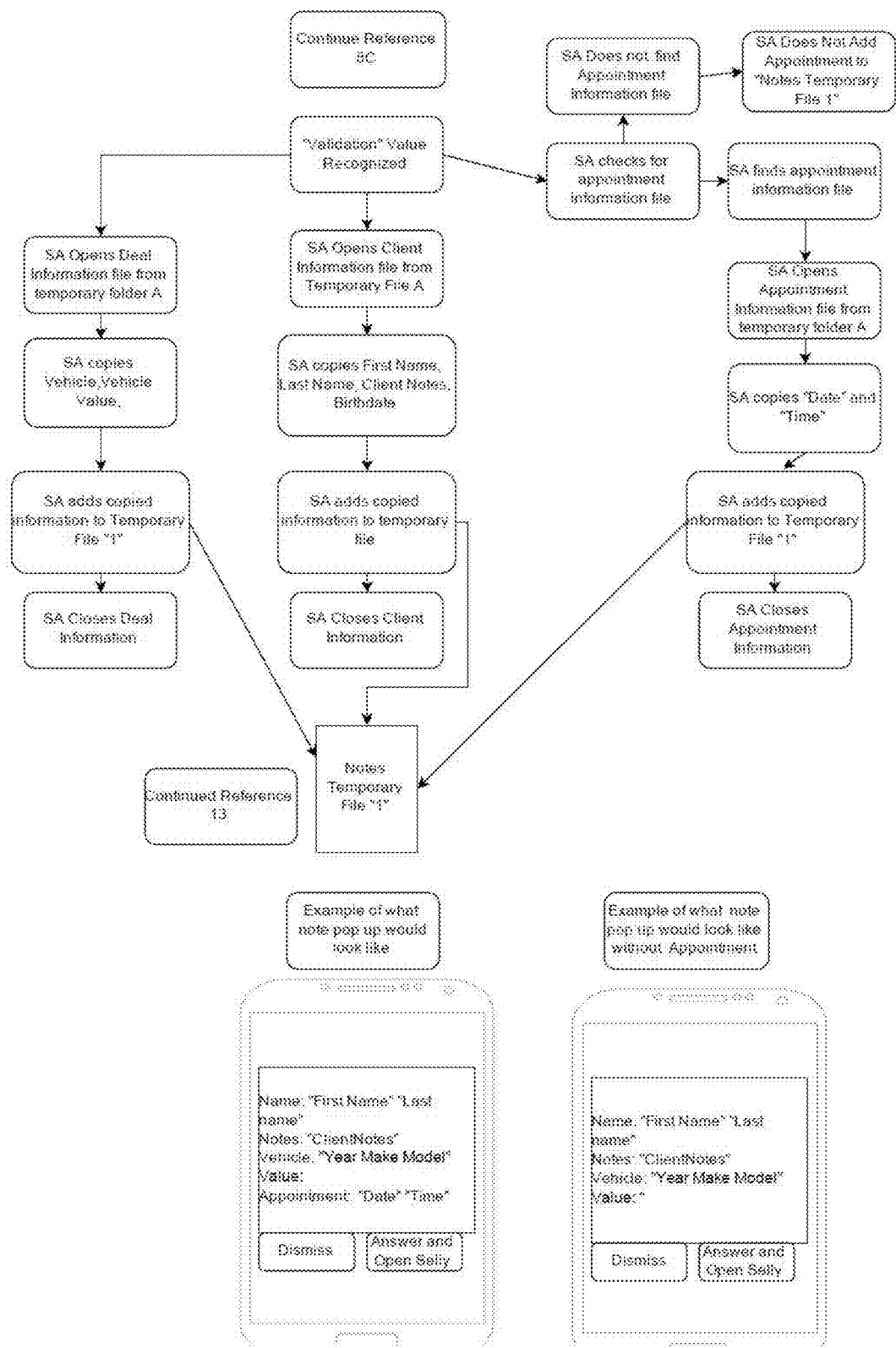

FIG. 13D illustrates that when the stage value is validation, the application can open the deal information file from the temporary folder. When the application opens the deal information file from the temporary folder, the application can copy information such as vehicle, vehicle value, or any combination thereof. When the application copies the information, the application can add the copied information to a notes temporary file, for example, notes temporary file 1. When the application adds the copied information to the notes temporary file, the application can close the deal information file.

When the stage value is validation, the application can open the client information file from the temporary folder. When the application opens the client information file, the application can copy information such as first name, last name, middle name, client notes, birthdate, or any combination thereof. When the application copies the information, the application can add the copied information to a notes temporary file, for example, notes temporary file 1. When the application adds the copied information to a notes temporary file, the application can close the client information file.

When the stage value is validation, the application can check for the appointment information file. If the application does not find the appointment information file, the application may not add appointments to the notes temporary file. If the application finds the appointment information file, the application can open the appointment information file from the temporary folder. When the application opens the appointment information file, the application can copy information such as date, time, or any combination thereof. When the application copies the information, the application can add the copied information to a notes temporary file, for example, notes temporary file 1. When the application adds the copied information to the notes temporary file, the application can close the appointment information file.

Figure 13E:
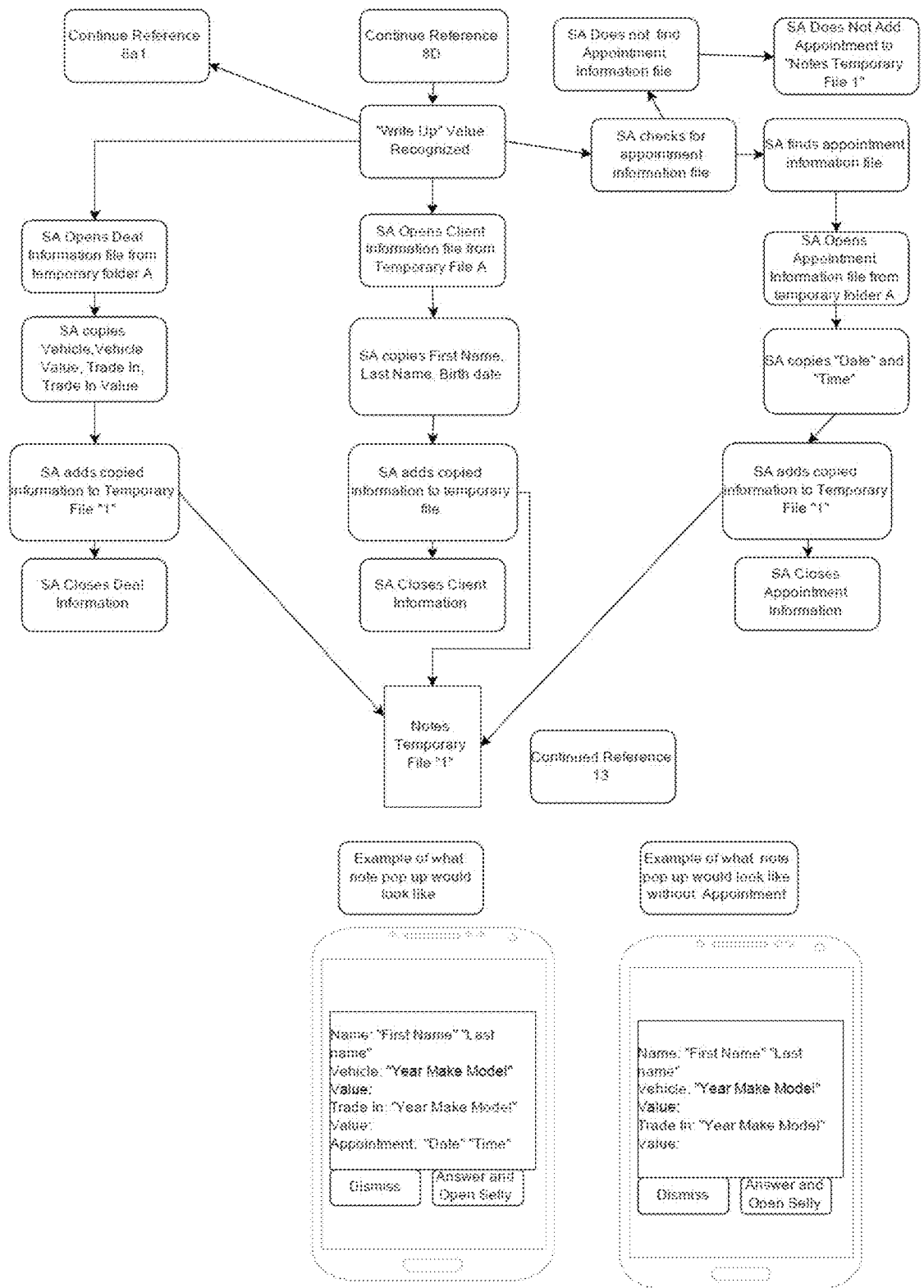

FIG. 13E illustrates that when the stage value is write up, the application can open the deal information file from the temporary folder. When the application opens the deal information file from the temporary folder, the application can copy information such as vehicle, vehicle value, trade in, trade in value, or any combination thereof. When the application copies the information, the application can add the copied information to a notes temporary file, for example, notes temporary file 1. When the application adds the copied information to the notes temporary file, the application can close the deal information file.

When the stage value is write up, the application can open the client information file from the temporary folder. When the application opens the client information file, the application can copy information such as first name, last name, middle name, client notes, birthdate, or any combination thereof. When the application copies the information, the application can add the copied information to a notes temporary file, for example, notes temporary file 1. When the application adds the copied information to a notes temporary file, the application can close the client information file.

When the stage value is write up, the application can check for the appointment information file. If the application does not find the appointment information file, the application may not add appointments to the notes temporary file. If the application finds the appointment information file, the application can open the appointment information file from the temporary folder. When the application opens the appointment information file, the application can copy information such as date, time, or any combination thereof. When the application copies the information, the application can add the copied information to a notes temporary file, for example, notes temporary file 1. When the application adds the copied information to the notes temporary file, the application can close the appointment information file.

Figure 13F:
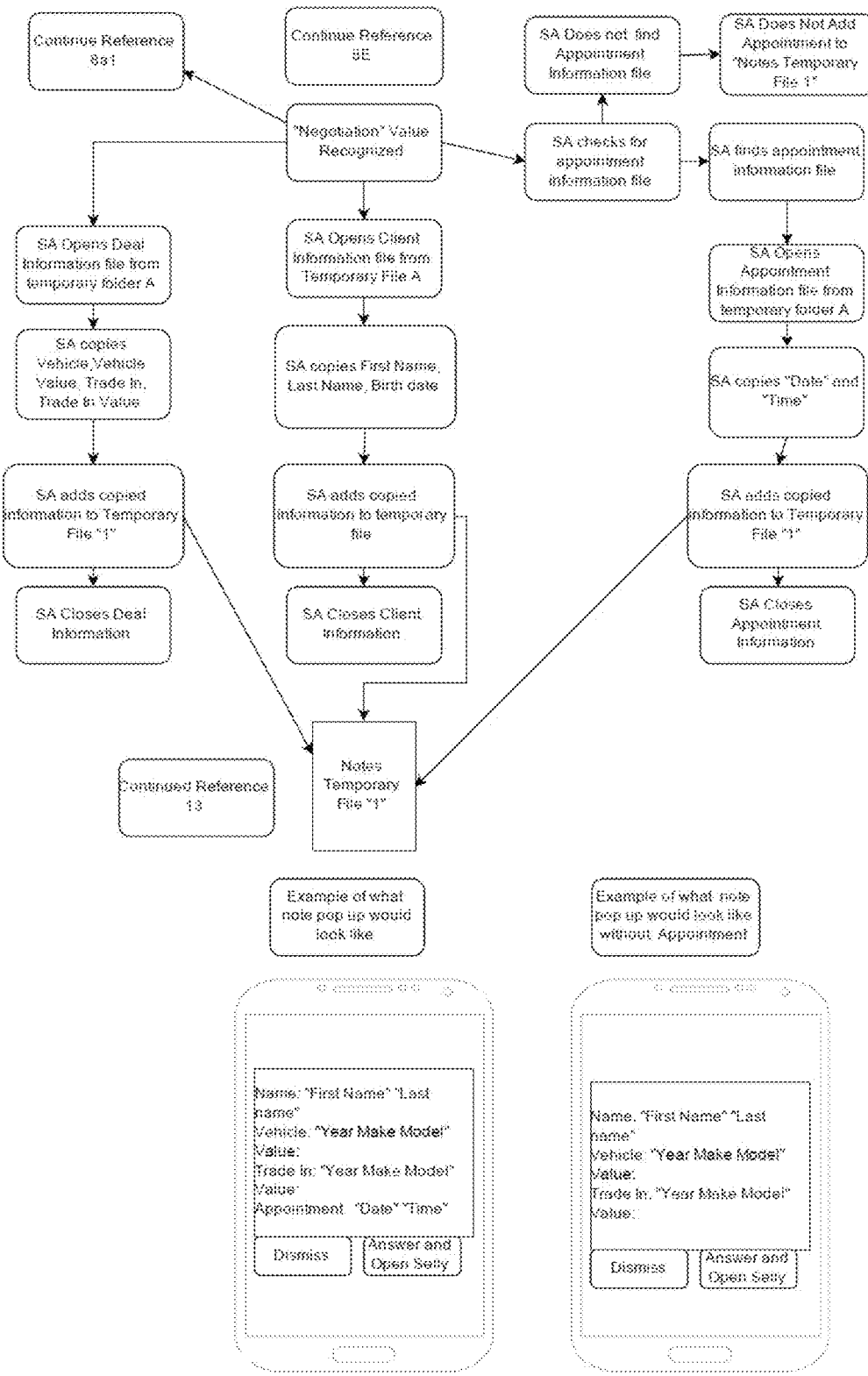

FIG. 13F illustrates that when the stage value is negotiation, the application can open the deal information file from the temporary folder. When the application opens the deal information file from the temporary folder, the application can copy information such as vehicle, vehicle value, trade in, trade in value, or any combination thereof. When the application copies the information, the application can add the copied information to a notes temporary file, for example, notes temporary file 1. When the application adds the copied information to the notes temporary file, the application can close the deal information file.

When the stage value is negotiation, the application can open the client information file from the temporary folder. When the application opens the client information file, the application can copy information such as first name, last name, middle name, client notes, birthdate, or any combination thereof. When the application copies the information, the application can add the copied information to a notes temporary file, for example, notes temporary file 1. When the application adds the copied information to a notes temporary file, the application can close the client information file.

When the stage value is negotiation, the application can check for the appointment information file. If the application does not find the appointment information file, the application may not add appointments to the notes temporary file. If the application finds the appointment information file, the application can open the appointment information file from the temporary folder. When the application opens the appointment information file, the application can copy information such as date, time, or any combination thereof. When the application copies the information, the application can add the copied information to a notes temporary file, for example, notes temporary file 1. When the application adds the copied information to the notes temporary file, the application can close the appointment information file.

Figure 13G:
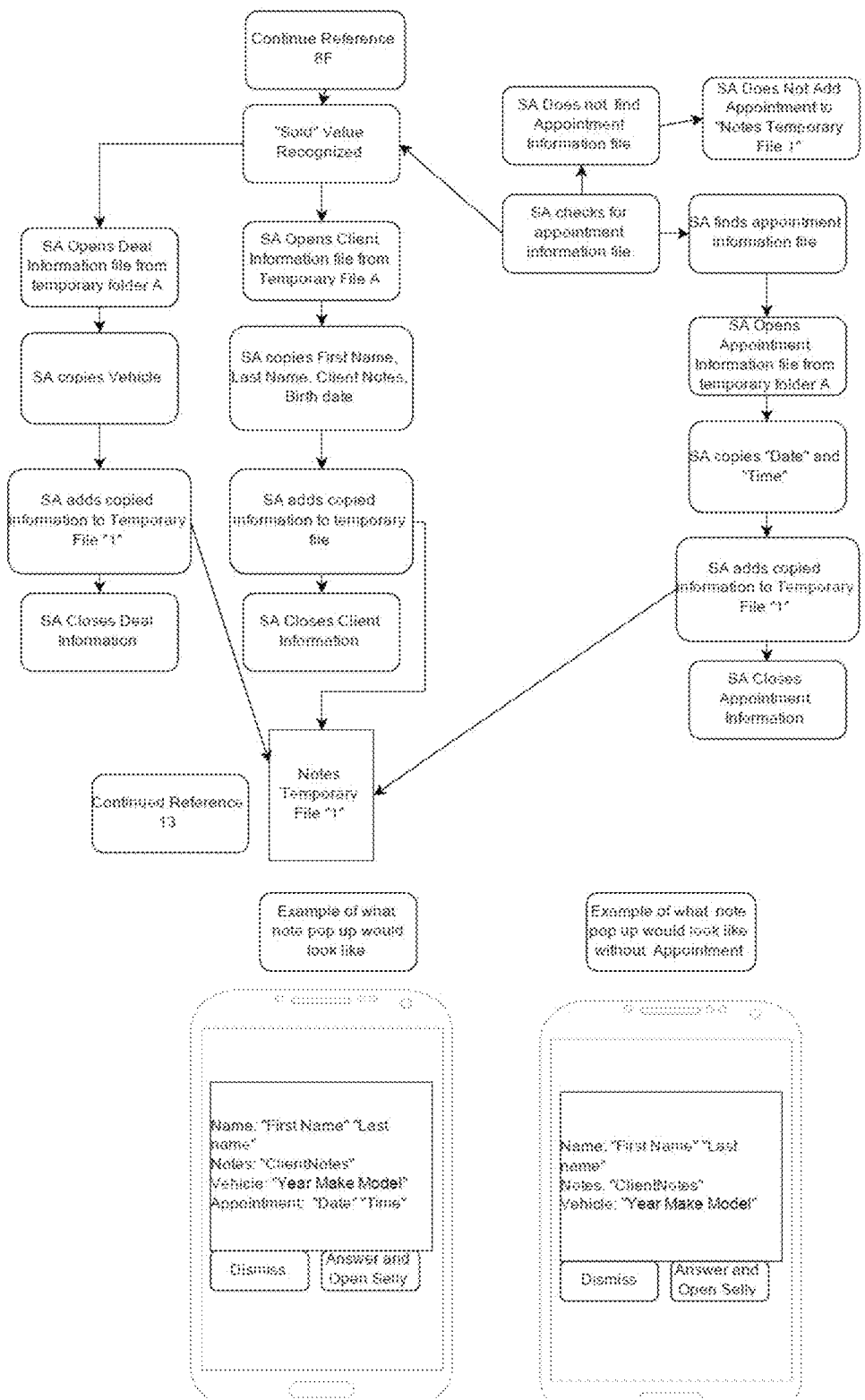

FIG. 13G illustrates that when the stage value is sold, the application can open the deal information file from the temporary folder. When the application opens the deal information file from the temporary folder, the application can copy information such as vehicle. When the application copies the information, the application can add the copied information to a notes temporary file, for example, notes temporary file 1. When the application adds the copied information to the notes temporary file, the application can close the deal information file.

When the stage value is sold, the application can open the client information file from the temporary folder. When the application opens the client information file, the application can copy information such as first name, last name, middle name, client notes, birthdate, or any combination thereof. When the application copies the information, the application can add the copied information to a notes temporary file, for example, notes temporary file 1. When the application adds the copied information to a notes temporary file, the application can close the client information file.

When the stage value is sold, the application can check for the appointment information file. If the application does not find the appointment information file, the application may not add appointments to the notes temporary file. If the application finds the appointment information file, the application can open the appointment information file from the temporary folder. When the application opens the appointment information file, the application can copy information such as date, time, or any combination thereof. When the application copies the information, the application can add the copied information to a notes temporary file, for example, notes temporary file 1. When the application adds the copied information to the notes temporary file, the application can close the appointment information file.

Figure 13H:
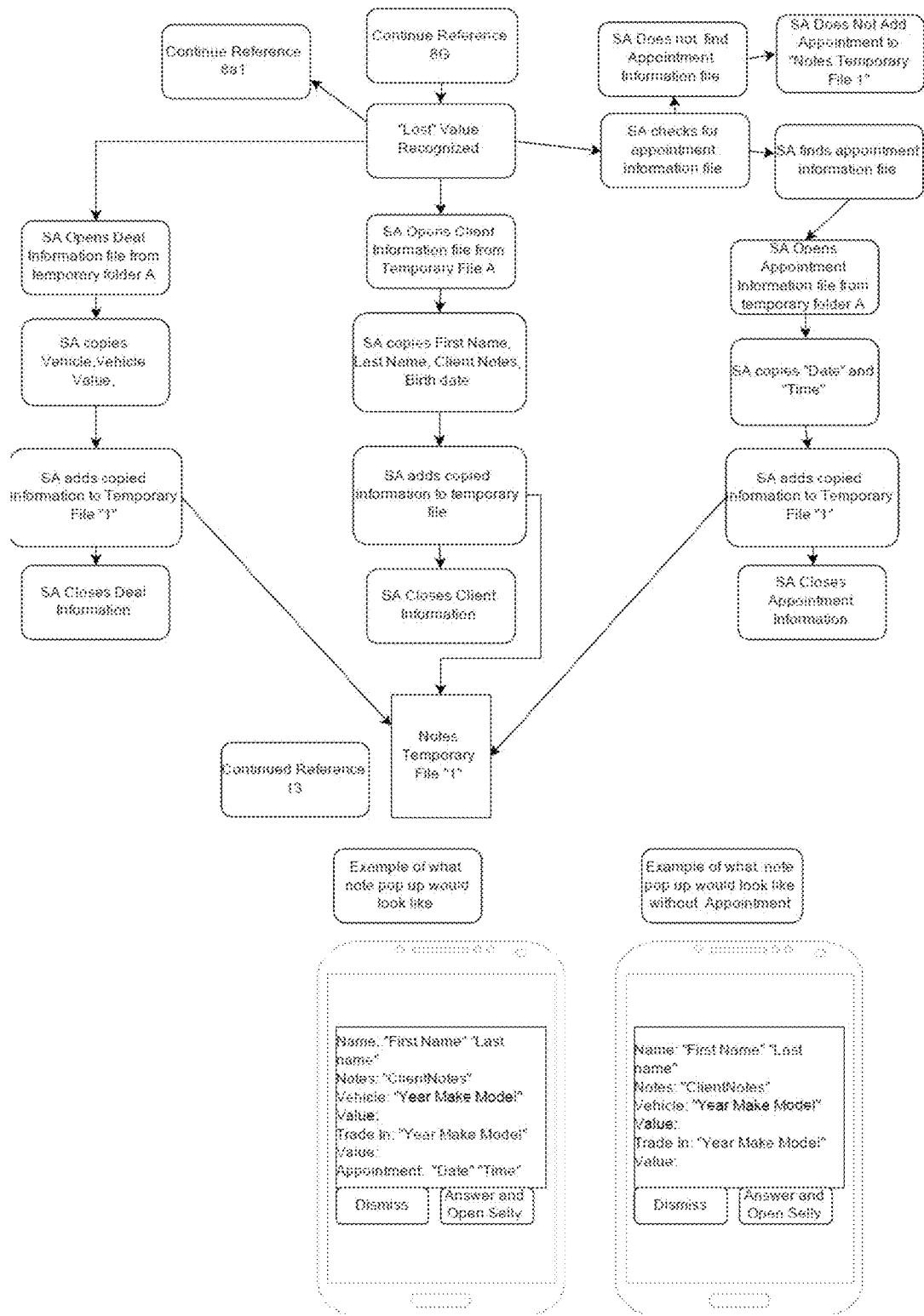

FIG. 13H illustrates that when the stage value is lost, the application can open the deal information file from the temporary folder. When the application opens the deal information file from the temporary folder, the application can copy information such as vehicle, vehicle value, or any combination thereof. When the application copies the information, the application can add the copied information to a notes temporary file, for example, notes temporary file 1. When the application adds the copied information to the notes temporary file, the application can close the deal information file.

When the stage value is lost, the application can open the client information file from the temporary folder. When the application opens the client information file, the application can copy information such as first name, last name, middle name, client notes, birthdate, or any combination thereof. When the application copies the information, the application can add the copied information to a notes temporary file, for example, notes temporary file 1. When the application adds the copied information to the notes temporary file, the application can close the client information file.

When the stage value is lost, the application can check for the appointment information file. If the application does not find the appointment information file, the application may not add appointments to the notes temporary file. If the application finds the appointment information file, the application can open the appointment information file from the temporary folder. When the application opens the appointment information file, the application can copy information such as name, number, date, time, or any combination thereof. When the application copies the information, the application can add the copied information to a notes temporary file, for example, notes temporary file 1. When the application adds the copied information to the notes temporary file, the application can close the appointment information file.

Figure 14A:
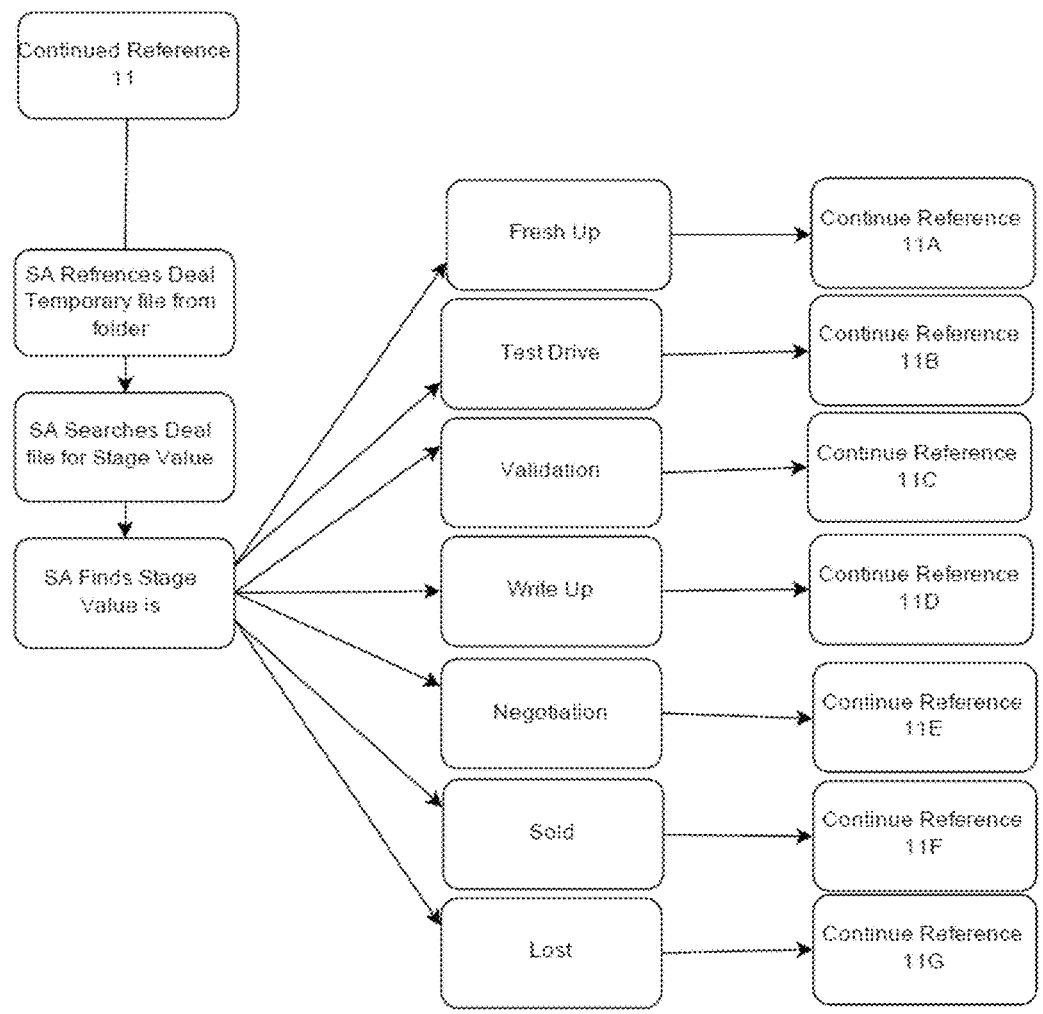

FIG. 14A illustrates when the application finds/does not find the temporary file of appointment information, the application can reference the deal information file from the temporary folder. When the application references the deal information file from the temporary folder, the application can search the deal information file for a stage value. The stage values can be, but is not limited to, fresh up, test drive, validation, write up, negotiation, sold, lost, or any combination thereof.

Figure 14B:
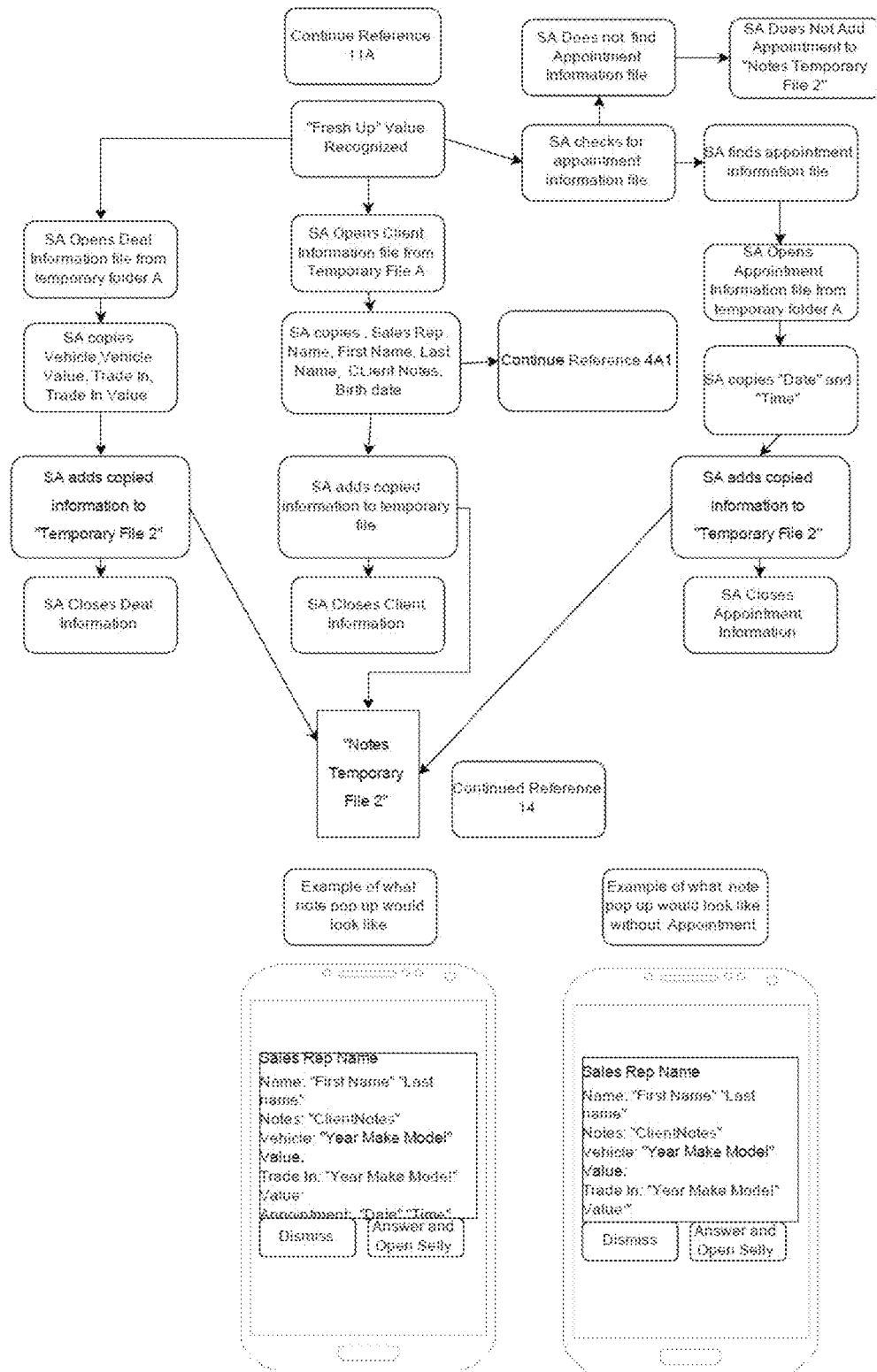

FIG. 14B illustrates that when the stage value is fresh up, the application can open the deal information file from the temporary folder. When the application opens the deal information file from the temporary folder, the application can copy information such as vehicle, vehicle value, trade in, trade in value or any combination thereof. When the application copies the information, the application can add the copied information to a second notes temporary file, for example, notes temporary file 2. When the application adds the copied information to the second notes temporary file, the application can close the deal information file.

When the stage value is fresh up, the application can open the client information file from the temporary folder. When the application opens the client information file, the application can copy information such as SA copies, sales representative name, first name, last name, middle name, client notes, birthdate, or any combination thereof. When the application copies the information, the application can add the copied information to a second notes temporary file, for example, notes temporary file 2. When the application adds the copied information to the second notes temporary file, the application can close the client information file.

When the stage value is fresh up, the application can check for the appointment information file. If the application does not find the appointment information file, the application may not add appointments to the second notes temporary file. If the application finds the appointment information file, the application can open the appointment information file from the temporary folder. When the application opens the appointment information file, the application can copy information such as date, time, or any combination thereof. When the application copies the information, the application can add the copied information to a second notes temporary file, for example, notes temporary file 2. When the application adds the copied information to the second notes temporary file, the application can close the appointment information file.

Figure 14C:
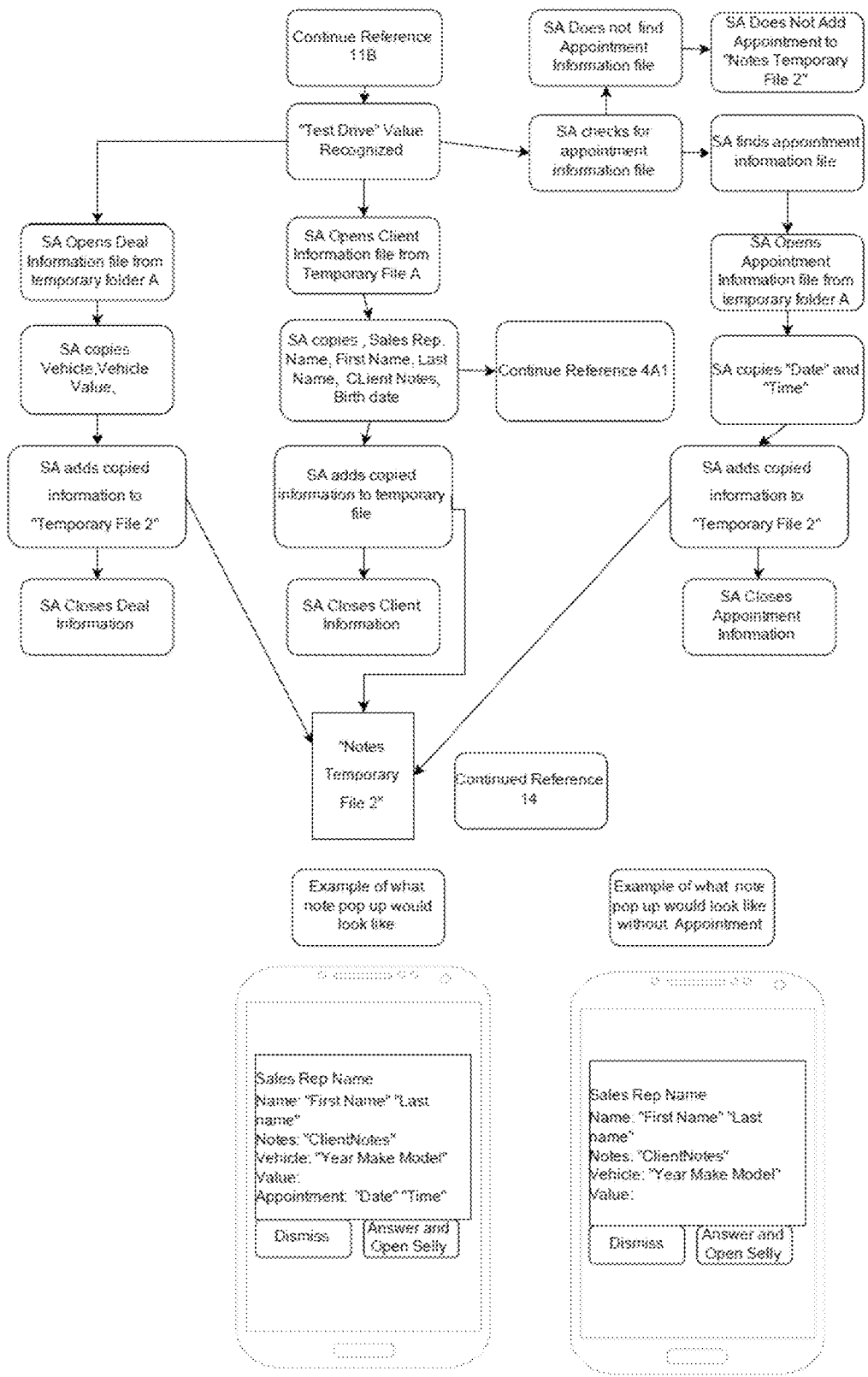

FIG. 14C illustrates that when the stage value is test drive, the application can open the deal information file from the temporary folder. When the application opens the deal information file from the temporary folder, the application can copy information such as vehicle, vehicle value, or any combination thereof. When the application copies the information, the application can add the copied information to a second notes temporary file, for example, notes temporary file 2. When the application adds the copied information to the second notes temporary file, the application can close the deal information file.

When the stage value is test drive, the application can open the client information file from the temporary folder. When the application opens the client information file, the application can copy information such as sales representative name, first name, last name, middle name, client notes, birthdate, or any combination thereof. When the application copies the information, the application can add the copied information to a second notes temporary file, for example, notes temporary file 2. When the application adds the copied information to the second notes temporary file, the application can close the client information file.

When the stage value is test drive, the application can check for the appointment information file. If the application does not find the appointment information file, the application may not add appointments to the second notes temporary file. If the application finds the appointment information file, the application can open the appointment information file from the temporary folder. When the application opens the appointment information file, the application can copy information such as date, time, or any combination thereof. When the application copies the information, the application can add the copied information to a second notes temporary file, for example, notes temporary file 2. When the application adds the copied information to the second notes temporary file, the application can close the appointment information file.

Figure 14D:
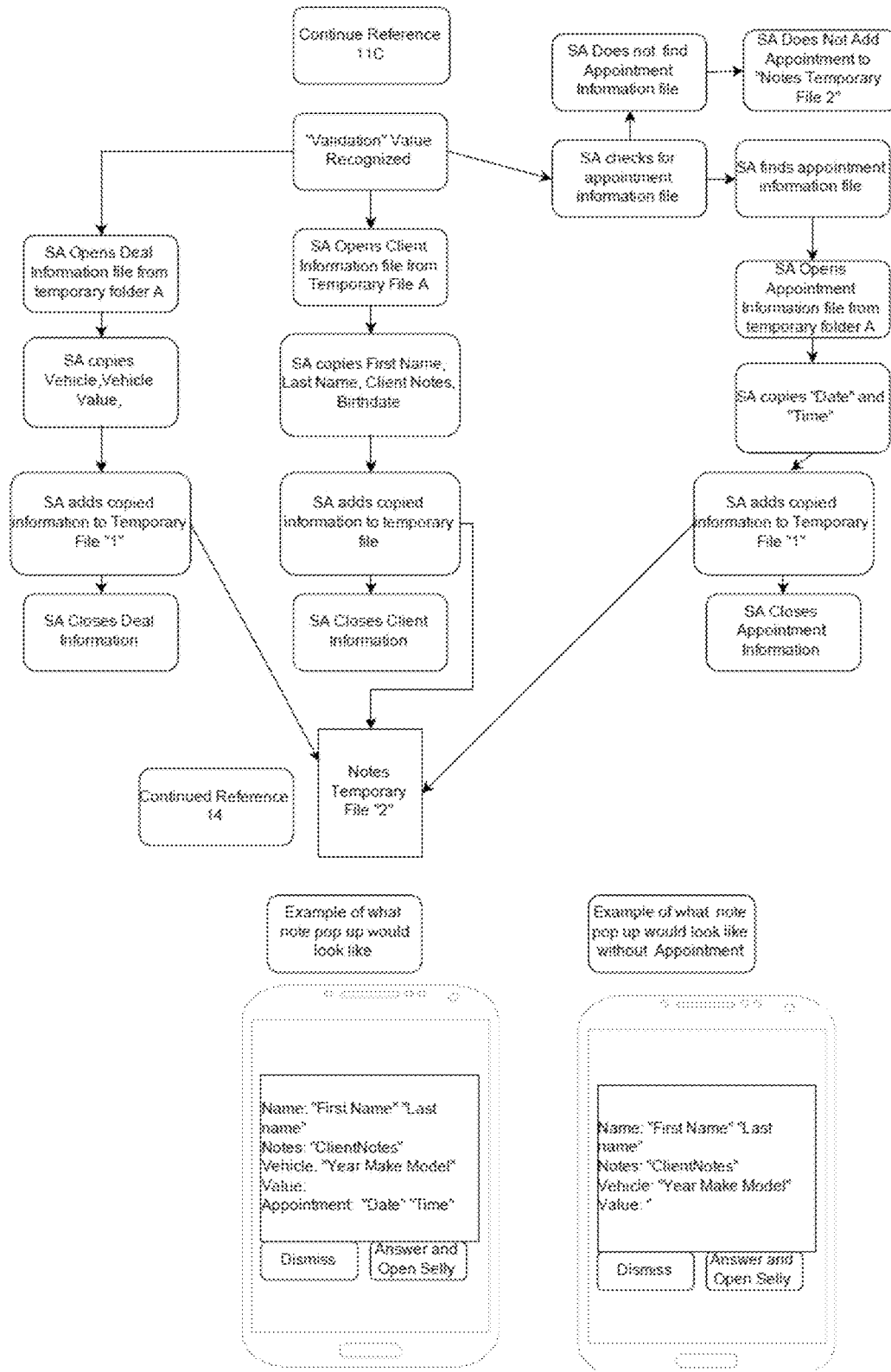

FIG. 14D illustrates that when the stage value is validation, the application can open the deal information file from the temporary folder. When the application opens the deal information file from the temporary folder, the application can copy information such as vehicle, vehicle value, or any combination thereof. When the application copies the information, the application can add the copied information to a second notes temporary file, for example, notes temporary file 2. When the application adds the copied information to the second notes temporary file, the application can close the deal information file.

When the stage value is validation, the application can open the client information file from the temporary folder. When the application opens the client information file, the application can copy information such as first name, last name, middle name, client notes, birthdate, or any combination thereof. When the application copies the information, the application can add the copied information to a second notes temporary file, for example, notes temporary file 2. When the application adds the copied information to the second notes temporary file, the application can close the client information file.

When the stage value is validation, the application can check for the appointment information file. If the application does not find the appointment information file, the application may not add appointments to the second notes temporary file. If the application finds the appointment information file, the application can open the appointment information file from the temporary folder. When the application opens the appointment information file, the application can copy information such as date, time, or any combination thereof. When the application copies the information, the application can add the copied information to a second notes temporary file, for example, notes temporary file 2. When the application adds the copied information to the second notes temporary file, the application can close the appointment information file.

Figure 14E:
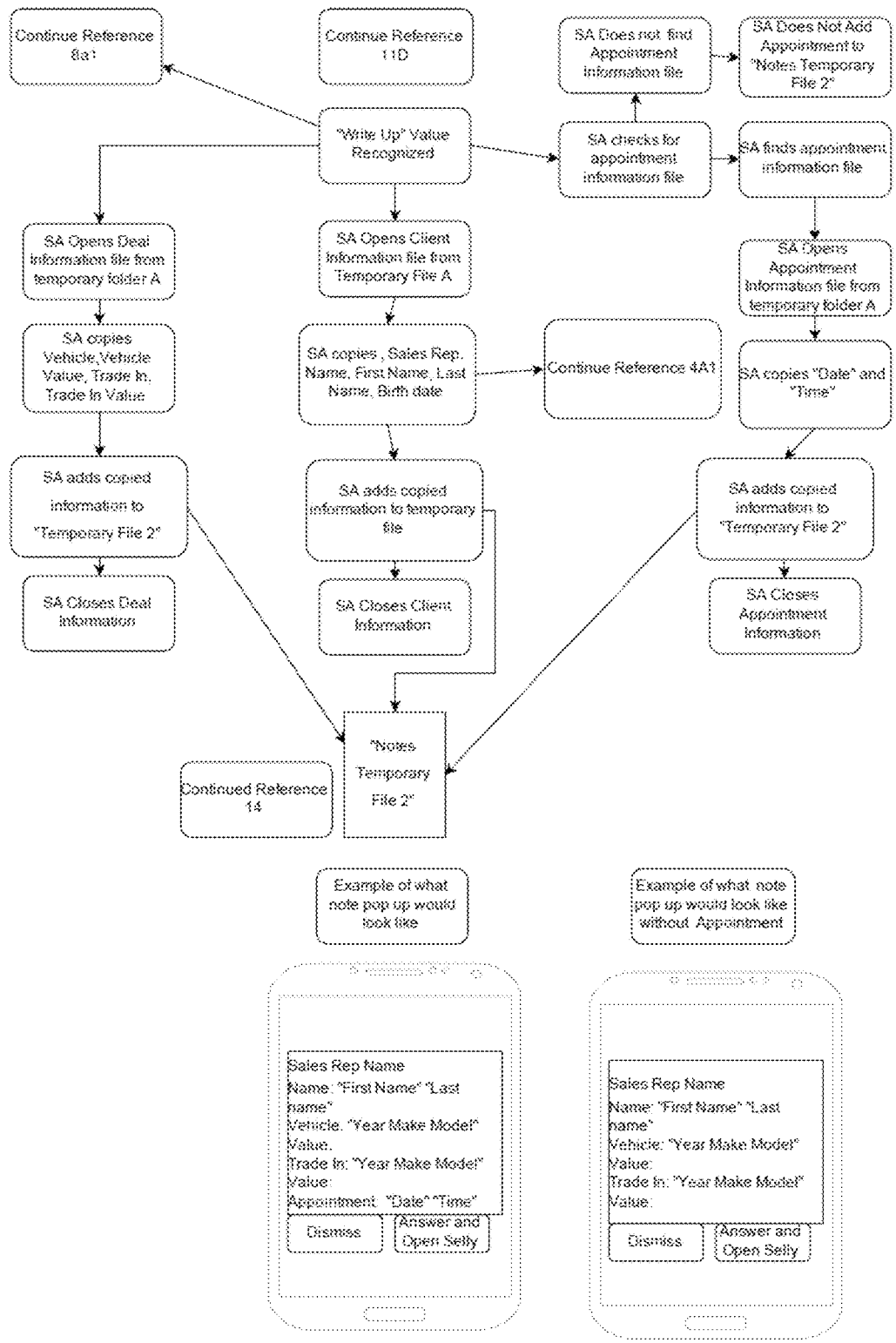

FIG. 14E illustrates that when the stage value is write up, the application can open the deal information file from the temporary folder. When the application opens the deal information file from the temporary folder, the application can copy information such as vehicle, vehicle value, trade in, trade in value, or any combination thereof. When the application copies the information, the application can add the copied information to a second notes temporary file, for example, notes temporary file 2. When the application adds the copied information to the second notes temporary file, the application can close the deal information file.

When the stage value is write up, the application can open the client information file from the temporary folder. When the application opens the client information file, the application can copy information such as sales representative name, client first name, client last name, client middle name, client notes, client birthdate, or any combination thereof. When the application copies the information, the application can add the copied information to a second notes temporary file, for example, notes temporary file 2. When the application adds the copied information to the second notes temporary file, the application can close the client information file.

When the stage value is write up, the application can check for the appointment information file. If the application does not find the appointment information file, the application may not add appointments to the second notes temporary file. If the application finds the appointment information file, the application can open the appointment information file from the temporary folder. When the application opens the appointment information file, the application can copy information such as date, time, or any combination thereof. When the application copies the information, the application can add the copied information to a second notes temporary file, for example, notes temporary file 2. When the application adds the copied information to the second notes temporary file, the application can close the appointment information file.

Figure 14F:
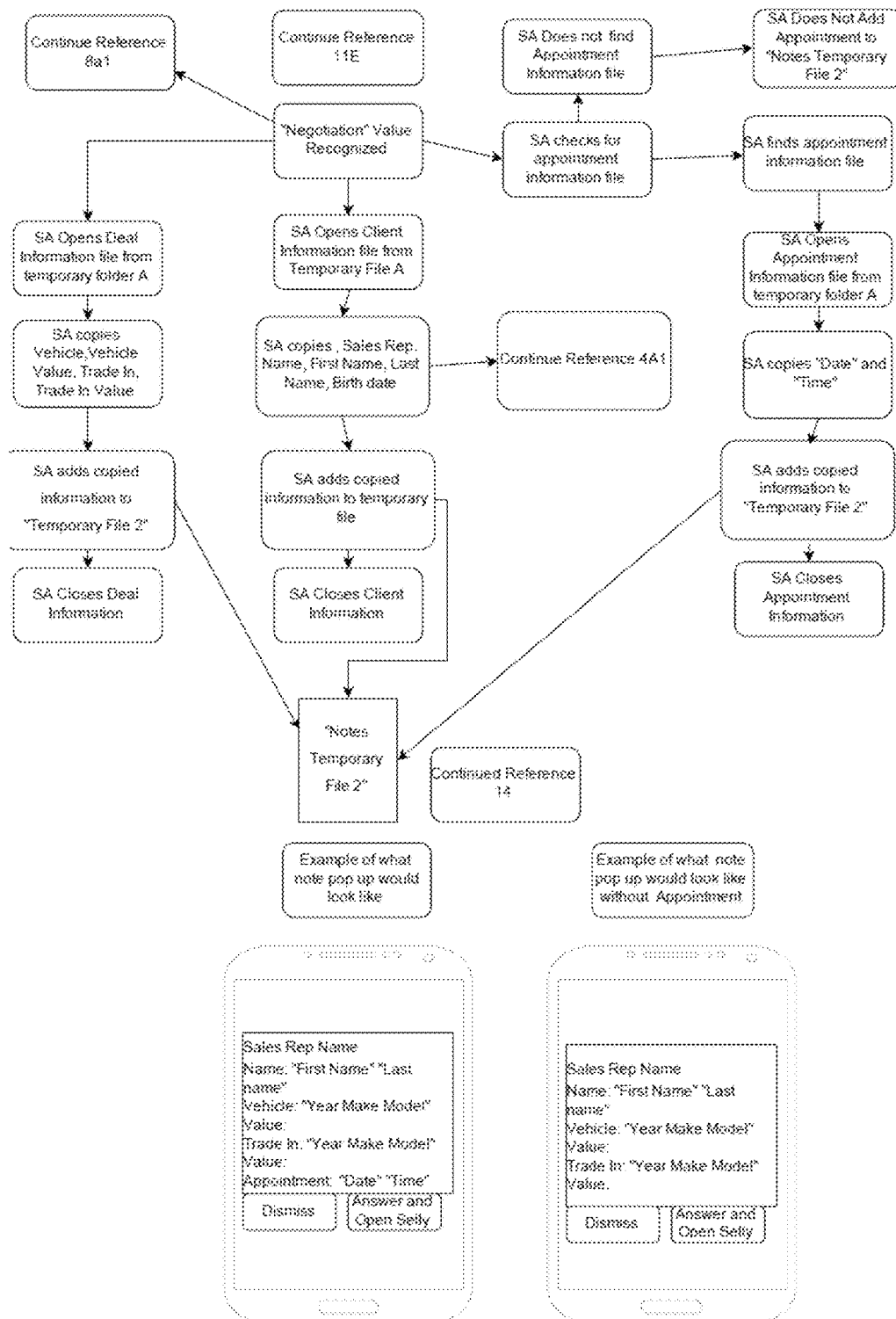

FIG. 14F illustrates that when the stage value is negotiation, the application can open the deal information file from the temporary folder. When the application opens the deal information file from the temporary folder, the application can copy information such as vehicle, vehicle value, trade in, trade in value, or any combination thereof. When the application copies the information, the application can add the copied information to a second notes temporary file, for example, notes temporary file 2. When the application adds the copied information to the second notes temporary file, the application can close the deal information file.

When the stage value is negotiation, the application can open the client information file from the temporary folder. When the application opens the client information file, the application can copy information such as sales representative name, first name, last name, middle name, client notes, birthdate, or any combination thereof. When the application copies the information, the application can add the copied information to a second notes temporary file, for example, notes temporary file 2. When the application adds the copied information to the second notes temporary file, the application can close the client information file.

When the stage value is negotiation, the application can check for the appointment information file. If the application does not find the appointment information file, the application may not add appointments to the second notes temporary file. If the application finds the appointment information file, the application can open the appointment information file from the temporary folder. When the application opens the appointment information file, the application can copy information such as date, time, or any combination thereof. When the application copies the information, the application can add the copied information to a second notes temporary file, for example, notes temporary file 2. When the application adds the copied information to the second notes temporary file, the application can close the appointment information file.

Figure 14G:
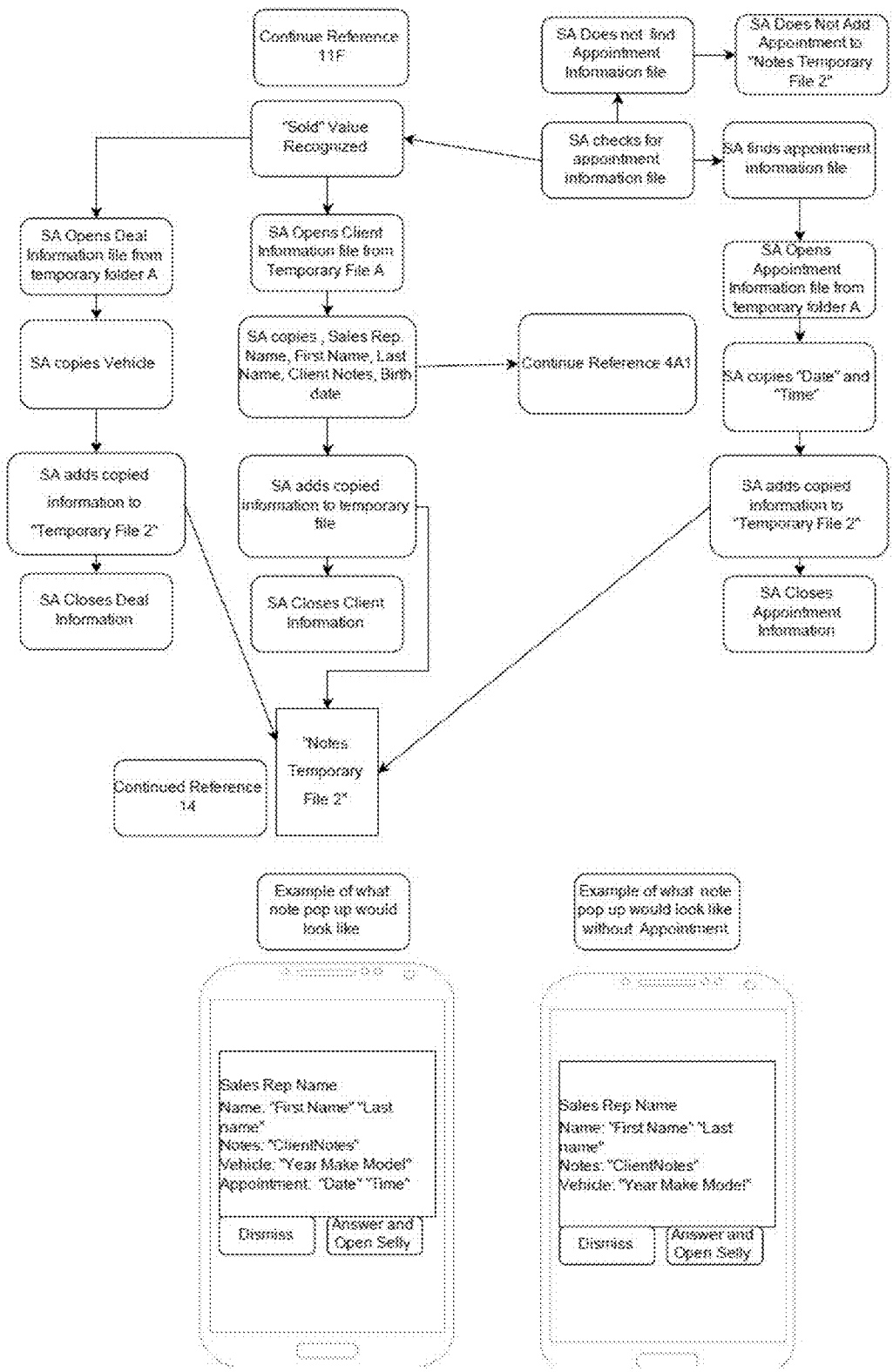

FIG. 14G illustrates that when the stage value is sold, the application can open the deal information file from the temporary folder. When the application opens the deal information file from the temporary folder, the application can copy information such as vehicle. When the application copies the information, the application can add the copied information to a second notes temporary file, for example, notes temporary file 2. When the application adds the copied information to the second notes temporary file, the application can close the deal information file.

When the stage value is sold, the application can open the client information file from the temporary folder. When the application opens the client information file, the application can copy information such as sales representative name, first name, last name, middle name, client notes, birthdate, or any combination thereof. When the application copies the information, the application can add the copied information to a second notes temporary file, for example, notes temporary file 2. When the application adds the copied information to the second notes temporary file, the application can close the client information file.

When the stage value is sold, the application can check for the appointment information file. If the application does not find the appointment information file, the application may not add appointments to the second notes temporary file. If the application finds the appointment information file, the application can open the appointment information file from the temporary folder. When the application opens the appointment information file, the application can copy information such as date, time, or any combination thereof. When the application copies the information, the application can add the copied information to a second notes temporary file, for example, notes temporary file 2. When the application adds the copied information to the second notes temporary file, the application can close the appointment information file.

Figure 14H:
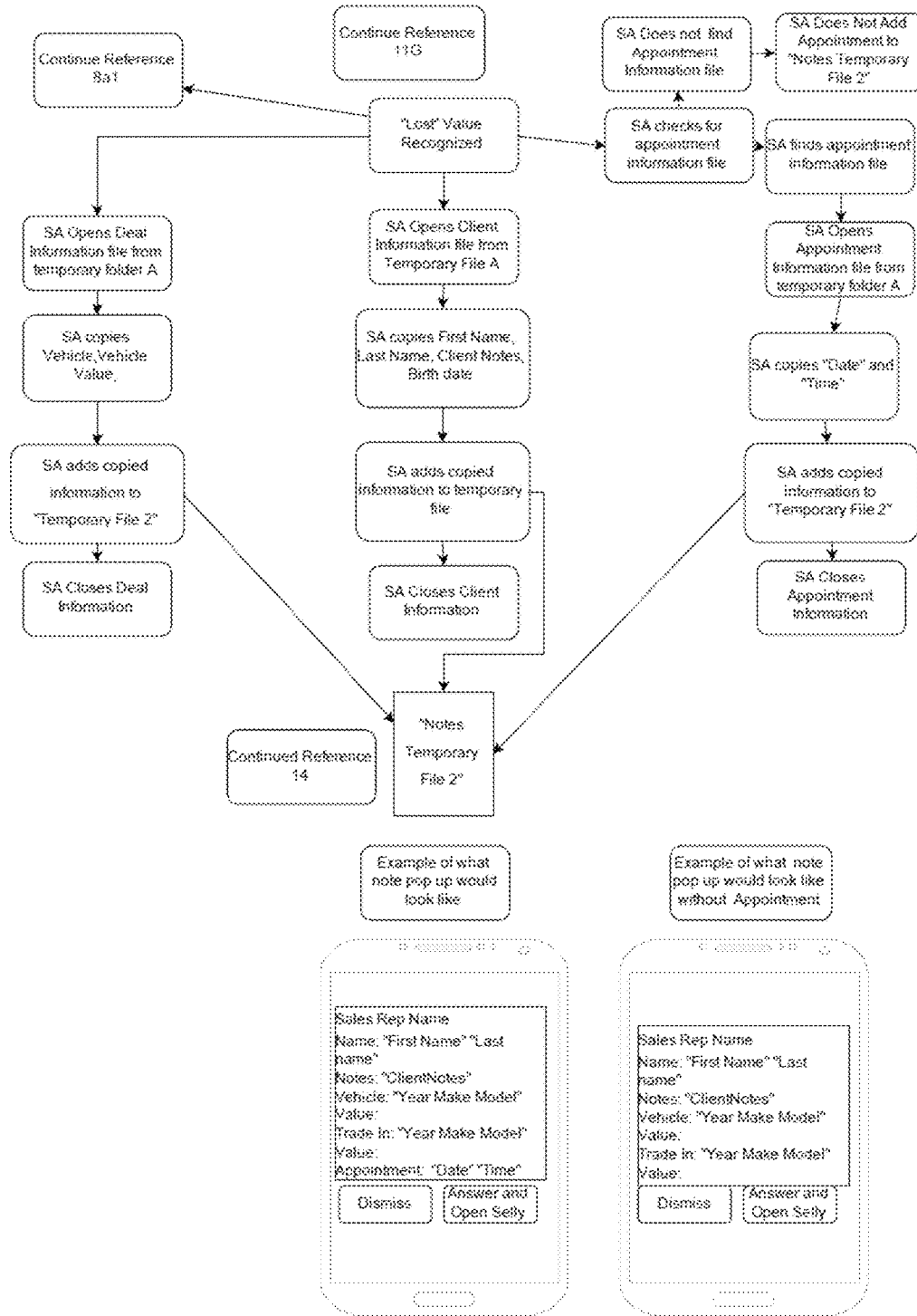

FIG. 14H illustrates that when the stage value is lost, the application can open the deal information file from the temporary folder. When the application opens the deal information file from the temporary folder, the application can copy information such as vehicle, vehicle value, or any combination thereof. When the application copies the information, the application can add the copied information to a second notes temporary file, for example, notes temporary file 2. When the application adds the copied information to the second notes temporary file, the application can close the deal information file.

When the stage value is lost, the application can open the client information file from the temporary folder. When the application opens the client information file, the application can copy information such as first name, last name, middle name, client notes, birthdate, or any combination thereof. When the application copies the information, the application can add the copied information to a second notes temporary file, for example, notes temporary file 2. When the application adds the copied information to the second notes temporary file, the application can close the client information file.

When the stage value is lost, the application can check for the appointment information file. If the application does not find the appointment information file, the application may not add appointments to the second notes temporary file. If the application finds the appointment information file, the application can open the appointment information file from the temporary folder. When the application opens the appointment information file, the application can copy information such as date, time, or any combination thereof. When the application copies the information, the application can add the copied information to a second notes temporary file, for example, notes temporary file 2. When the application adds the copied information to the second notes temporary file, the application can close the appointment information file.

Figure 14I:
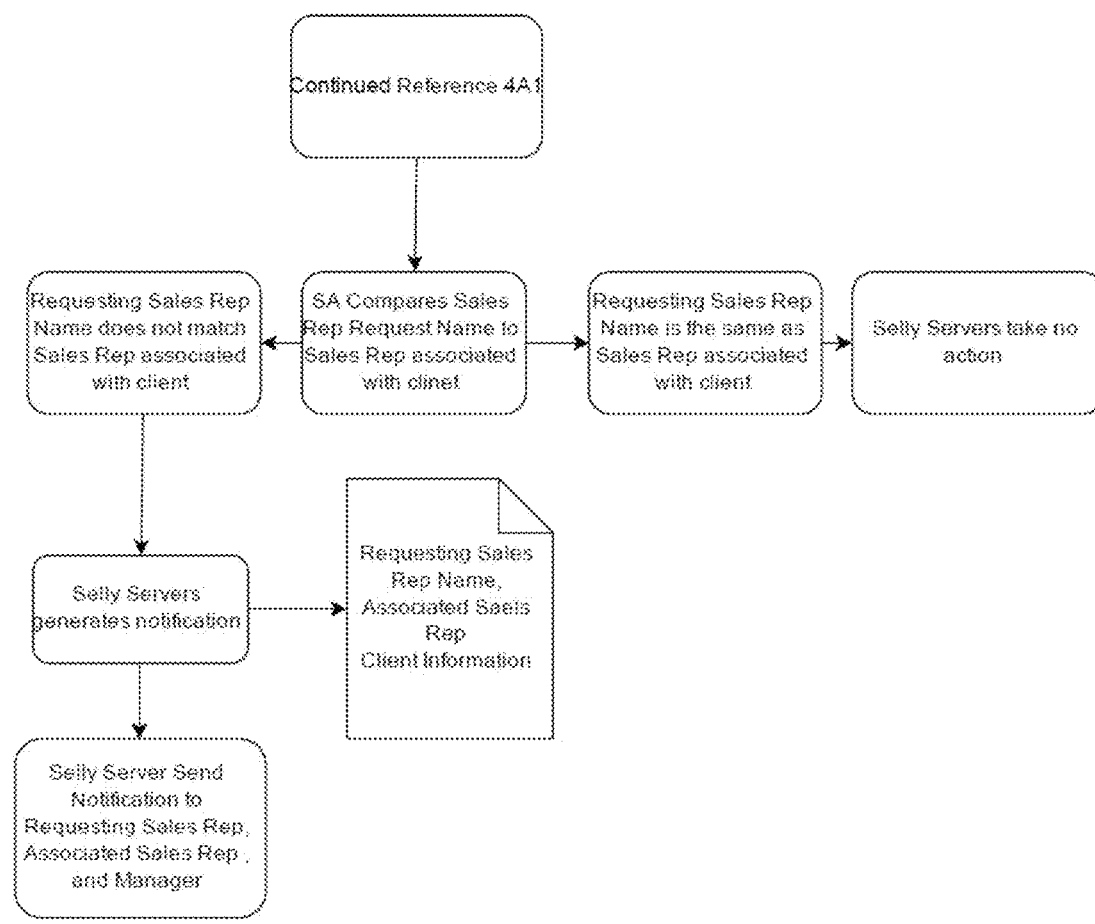

FIG. 14I illustrates that when the application copies the sales representative's name, the application compares the sales representative's name requesting the information to the sales representative associated with the client. The sales representative's name can be copied during any stage value. If the sales representative's name requesting the information is the same as the sales representative's name associated with the client, the application takes no action. If the sales representative's name requesting the information is different than the sales representative's name associated with the client, then the application and/or the servers generate a notification. When the application and/or the servers generate a notification, the server/application requests the requesting sales representative's name, the associated sales representative's name, client information, or any combination thereof. When the server/application generates the notification, the server sends a notification to the requesting sales representative, the associated sales representative, the manager, or any combination thereof. The comparison of the names can be substituted such that the sale's representative's numbers, mobile device, mobile device number, email, or any combination thereof can be compared.

For example, a requesting first mobile device can request user information (e.g., client profile) from a server. The first mobile device can be associated with a first mobile device identifier (e.g., number, name, email, address, code, or any combination thereof). The server can search for the user information. The user information can comprise a stored mobile device identifier. The server can compare the stored mobile device identifier with the first mobile device identifier. When the first mobile device identifier is not the same as the stored mobile device identifier, the server can generate a notification to the first mobile device, a second mobile device associated with the stored mobile device identifier, and a third mobile device.

Figure 14J:
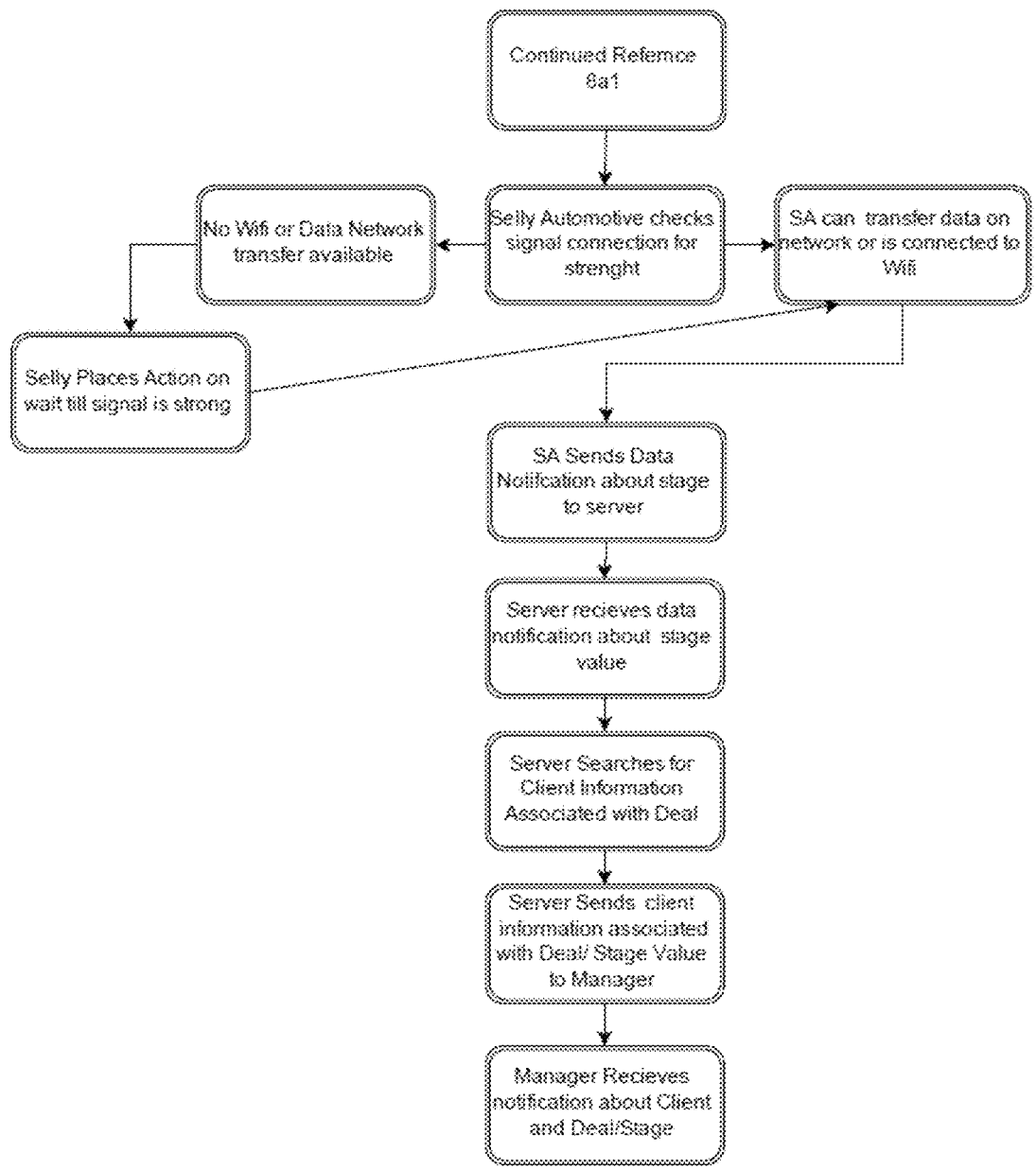

FIG. 14J illustrates that when any stage value is recognized, the application can check signal connection for strength. If no WIFI or data network transfer is available, the application can place the action on wait until signal is strong. If the application can transfer data on the network or is connected to WIFI, the application can send data notification about the stage to the server. When the application sends data notification about the stage to the server, the server can receive the data notification about the stage value. When the server receives data notification about the stage value, the server can search for client information associated with the deal. When the server searches for client information associated with the deal, the server can send client information associated with deal/stage value to a manager (i.e., another mobile device). The manager can receive the notification from the server about client and deal/stage.

Figure 15A:
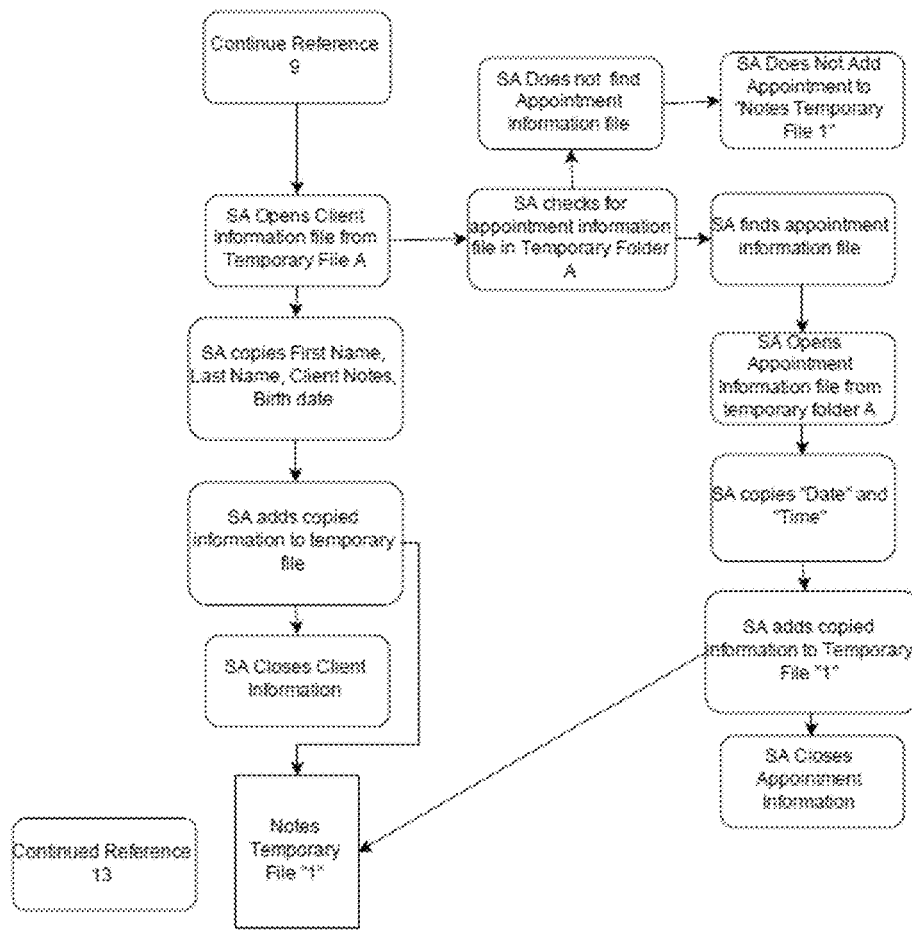
Figure 15A:
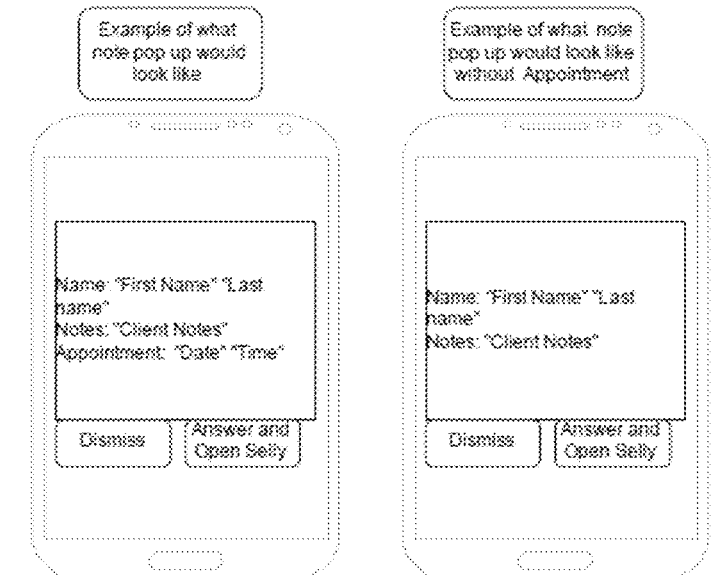

FIG. 15A illustrates that when the application does not find the temporary deal information file in the temporary folder (see FIG. 12A), the application can open the client information file from the temporary file/temporary folder. When the client information file is open, the application can copy information such as first name, last name, client notes, birthdate, or any combination thereof. When the information is copied, the application can add the copied information to a notes temporary file, for example, notes temporary file 1. When the application adds the copied information to the notes temporary file, the application can close the client information file.

When the application opens the client information file from the temporary file/temporary folder, the application can check for the appointment information file. If the application does not find the appointment information file, the application may not add appointments to the notes temporary file. If the application finds the appointment information file, the application can open the appointment information file from the temporary folder. When the application opens the appointment information file, the application can copy information such as date, time, or any combination thereof. When the application copies the information, the application can add the copied information to a notes temporary file, for example, notes temporary file 1. When the application adds the copied information to the notes temporary file, the application can close the appointment information file.

Figure 15B:
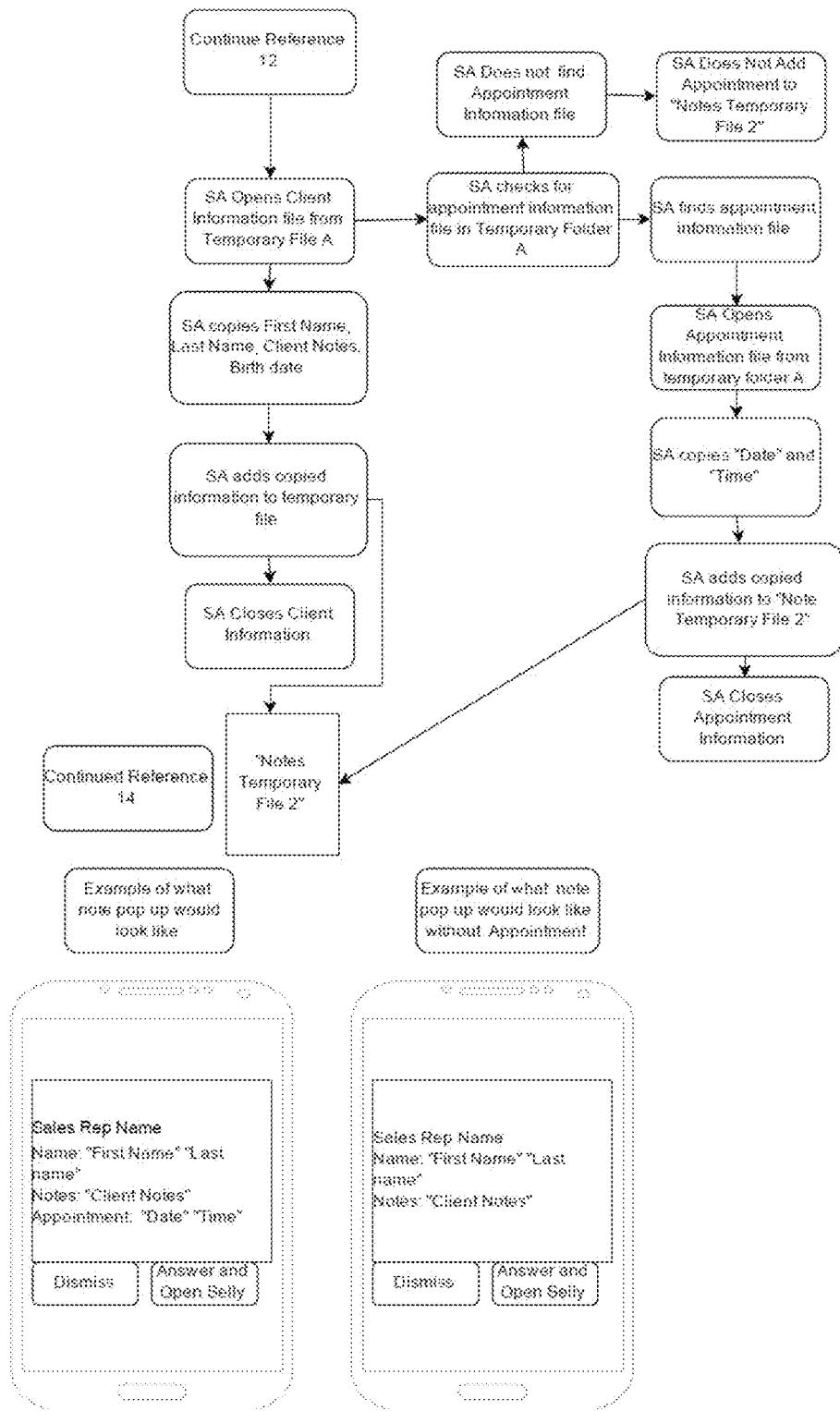

FIG. 15B illustrates that when the application does not find the temporary deal information file in the temporary folder (see FIG. 12B), the application can open the client information file from the temporary file/temporary folder. When the client information file is open, the application can copy information such as first name, last name, client notes, birth date, or any combination thereof. When the information is copied, the application can add the copied information to a second notes temporary file, for example, notes temporary file 2. When the application adds the copied information to the second notes temporary file, the application can close the client information file.

When the application opens the client information file from the temporary file/temporary folder, the application can check for the appointment information file. If the application does not find the appointment information file, the application may not add appointments to the second notes temporary file. If the application finds the appointment information file, the application can open the appointment information file from the temporary folder. When the application opens the appointment information file, the application can copy information such as date, time, or any combination thereof. When the application copies the information, the application can add the copied information to a second notes temporary file, for example, notes temporary file 2. When the application adds the copied information to the second notes temporary file, the application can close the appointment information file.

Figure 16:
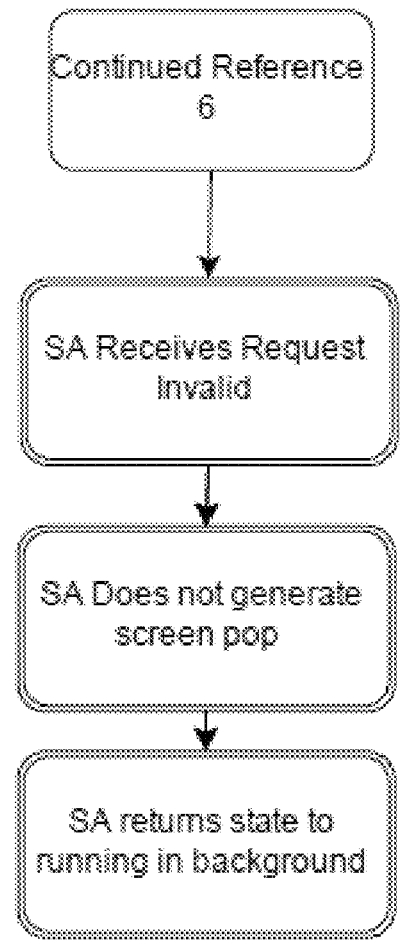

FIG. 16 illustrates that when the application cancels the server request, the application can receive invalid request. The application may not generate a screen pop up on the mobile device. The application can return to the state in which it runs in the background of the device.

Figure 17:
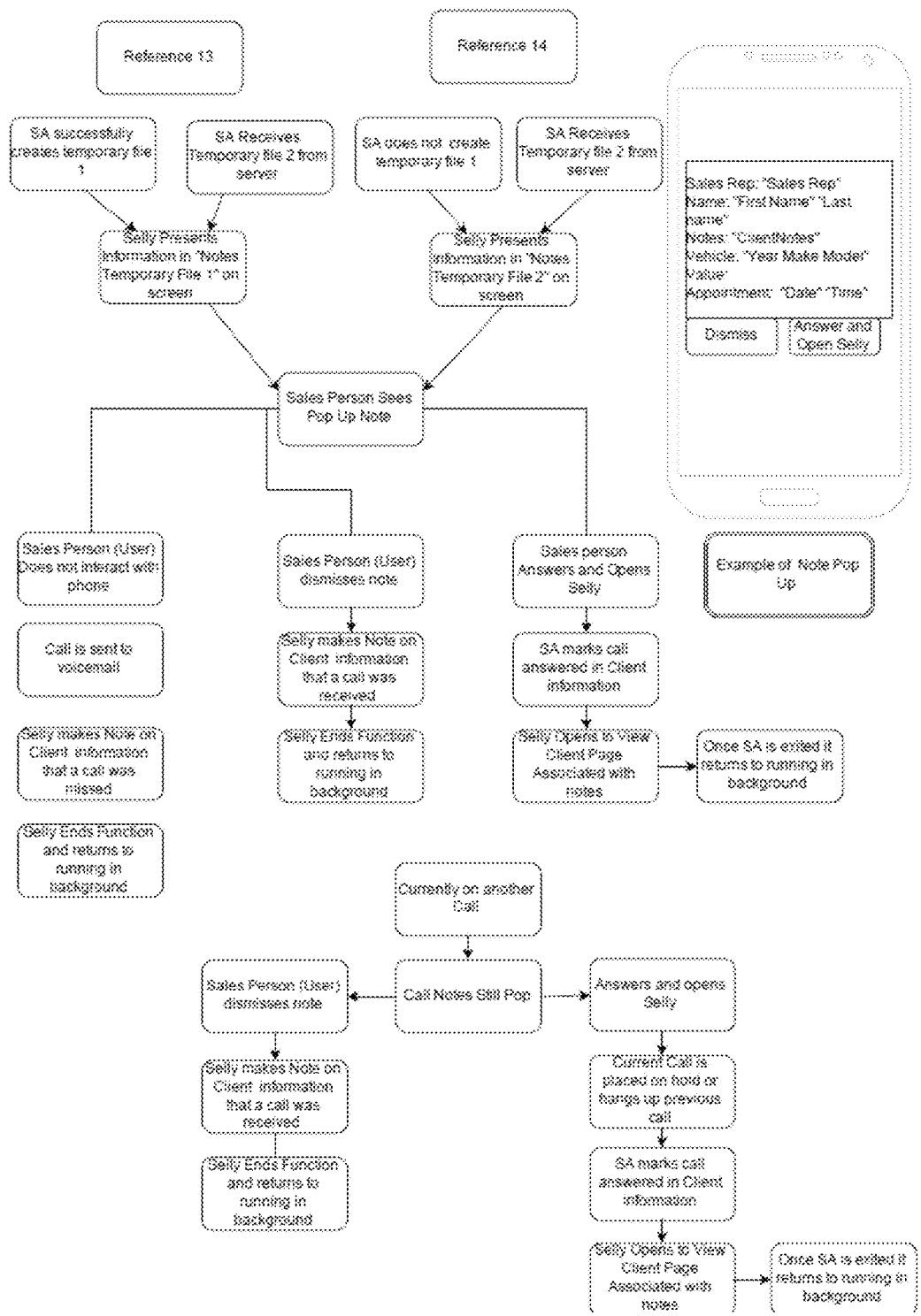

FIG. 17 illustrates that when the application successfully creates a temporary file (e.g., temporary file 1) and/or the application receives temporary file 2 from the server, the application presents the information in the notes temporary file on the screen (notes temporary file 1 and/or notes temporary file 2). When the application does not create a temporary file (e.g., temporary file 1) and the application receives temporary file 2, the application presents the information in the notes temporary file on the screen (notes temporary file 1 and/or notes temporary file 2).

When the application presents the information on the mobile device screen, a user can see the pop up note. When the user sees the pop up note, the user may not interact with the mobile device. The call can be sent to voicemail. The application can make a note on the client information that a call was missed. The application can end function and return to running in the background.

When the application presents the information on the device screen, the user can dismiss the note. The application can make note on the client information that a call was received. The application can end function and return to running in the background.

When the application presents the information on the device screen, the user can answer and open the entire application. The application can mark the call as answered in the client information. The application can open to view client page or entire client profile associated with notes. When the application is exited, the application can return to running in the background.

When the user is on another call, the pop up note can display on the screen. If the user dismisses the note, the application can make a note on the client information that a call was received. The application can end function and return to running the background. If the user answer and opens the application, the current call can be placed on hold or can be hung up. The application can mark the call as answered in the client information. The application can open to view client page associated with notes. When the application is exited, the application can return to running in the background.

The term connected/connection can mean transfer of data in either direction, attached to, coupled to, hardwired, wireless connection, connected by WAN, connected by LAN, physically connected, requesting data between devices/servers, transferring of data in either direction wirelessly, transferring of data in either direction via hardwire, or any combination thereof. The term database can include remote database, local database, mobile database, external database, or any combination thereof. The term user information can be the same as client information, client profile, client profile information, deal information, appointment information, number or any combination thereof.

All steps in the process and flowcharts described in the application can be done sequentially, at the same time, at different times, or any combination thereof. Any process described in the application can be completed by a processor. The processor can be located on the device (e.g., mobile device), on the local server, on the local database, on the remote server, on the remote database, or any combination thereof.

It is apparent to one having ordinary skill in the art that various changes and modifications can be made to this disclosure, and equivalents employed, without departing from the spirit and scope of the invention. Elements shown with any embodiment are exemplary for the specific embodiment and can be used on other embodiments within this disclosure.

We claim:

1. A method for displaying a pop up note in a first mobile device after receiving a call from a second mobile device regarding real-time sales information relating to the second mobile device comprising:
   receiving the call from the second mobile device of a client on the first mobile device;
   automatically launching a mobile application installed on the first mobile device, wherein the mobile application requests and receives a second mobile device identifier of the second mobile device;
   requesting a search for client profile data associated with the second mobile device identifier in a first mobile device database of the first mobile device, a local server database, and a remote server database, wherein the search is requested by the mobile application;
   retrieving the client profile data associated with the second mobile device, the client profile data comprising at least one of a first subset of the client profile data stored in the first mobile device database of the first mobile device, a second subset of the client profile data stored on the local server database, and a third subset of the client profile data stored on the remote server database;
   determining a stage value once the client profile data is retrieved, wherein the stage value represents a current stage at which the client is at in a purchase process having multiple stages, wherein the client profile data comprises real-time sales information relating to the client's current stage value;
   creating a temporary folder in the first mobile device and copying and placing the client profile data in the temporary folder; and
   displaying a display subset of the client profile data on a pop-up note on a call screen of the first mobile device, wherein the call screen of the first mobile device provides a user interface that allows for a user to reject the incoming call or accept the incoming call and open the mobile application.

2. The method of claim 1, wherein displaying the display subset of the client profile data on the pop-up note on the call screen is for the duration of the call.

3. The method of claim 1, wherein displaying the display subset of the client profile data on the pop-up note on a call screen is for at least 30 seconds.

4. The method of claim 1, further comprising answering the call on the first mobile device, wherein answering the call comprises displaying a user profile on the first mobile device.

5. The method of claim 1, further comprising disabling the displaying of the display subset of the client profile data on the pop-up note on the call screen if the client profile data is not found.

6. The method of claim 1, wherein the client profile data comprises at least one of data relating to whether the client is a new client, data relating to whether the client has performed a test drive, data relating to whether the salesman can provide an initial quote on the car's price, data relating to whether the client has negotiated with any salesmen, and data relating to whether the client has come to an agreement on a price.

7. A non-transitory computer readable medium on a first mobile device having stored therein instructions for causing a processor of the first mobile device to execute a method comprising: receiving a call on the first mobile device, wherein the call is from a second mobile device of a client; automatically launching a mobile application installed on the first mobile device, wherein the mobile application requests and receives a second mobile device identifier of the second mobile device; requesting a search for client profile data associated with the second mobile device identifier in a first mobile device database of the first mobile device, a local server database, and a remote server database, wherein the search is requested by the mobile application; retrieving the client profile data associated with the second mobile device, the client profile data comprising at least one of a first subset of the client profile data stored in the first mobile device database of the first mobile device, a second subset of the client profile data stored on a local server database, and a third subset of the client profile data stored on a remote server database; determining a stage value once the client profile data is retrieved, wherein the stage value represents a current stage at which the client is at in a purchase process having multiple stages, wherein the client profile data comprises real-time sales information relating to the client's current stage value; creating a temporary folder in the first mobile device and copying and placing the client profile data in the temporary folder; and displaying a display subset of the client profile data on a pop-up note on a call screen of the first mobile device, wherein the call screen of the first mobile device provides a user interface that allows for a user to reject the incoming call or accept the incoming call and open the mobile application.

8. The non-transitory computer readable medium of claim 7, further comprising retrieving the client profile data via a local area network.

9. The non-transitory computer readable medium of claim 7, further comprising retrieving the client profile data via a remote server comprising the remote server database, wherein the remote server is configured to send the third subset of the client profile data to the first mobile device if the third subset of the client profile data is found.

10. The non-transitory computer readable medium of claim 9, further comprising retrieving the client profile data via a wide area network.

11. The non-transitory computer readable medium of claim 9, further comprising retrieving the client profile data via an external server comprising an external server database, wherein the external server database is configured to store a fourth subset of the client profile data, wherein the external server is configured to send the fourth subset of the client profile data to the remote server if the fourth subset of the client profile data is found, and 1 wherein the remote server is configured to send the fourth subset of the client profile data from the external server to the first mobile device.

12. The non-transitory computer readable medium of claim 7, wherein the displaying of the subset of the client profile data is for the duration of the call.

13. The non-transitory computer readable medium of claim 7, wherein the displaying of the subset of the client profile data is for at least 30 seconds.

14. The non-transitory computer readable medium of claim 7, wherein the first mobile device comprises an optical sensor, wherein the optical sensor is configured to scan vehicle identification numbers, business cards, and driver's licenses.

15. A method for displaying a pop up note in a first mobile device after receiving a call from a second mobile device regarding real-time sales information relating to the second mobile device comprising:
receiving the call from the second mobile device of a client on the first mobile device;
automatically launching a mobile application installed on the first mobile device, the mobile application requests and receives a second mobile device identifier of the second mobile device;
requesting a search for client profile data associated with the second mobile device identifier in a first mobile device database of the first mobile device, a second mobile device database of the second mobile device, a local server database, and a remote server database, wherein the search is requested by the mobile application;
retrieving the client profile data associated with the second mobile device, wherein the client profile data comprising at least one of a first subset of the client profile data stored in the first mobile device database of the first mobile device, a second subset of the client profile data stored on the second mobile device database, a third subset of the client profile data stored on a local server database, and a fourth subset of the client profile data stored on the remote server database;
determining a stage value once the client profile data is retrieved, wherein the stage value represents a current stage at which the client is at in a purchase process having multiple stages, wherein the client profile data comprises real-time sales information relating to the client's current stage value;
creating a temporary folder in the first mobile device and copying and placing the client profile data in the temporary folder; and
displaying a display subset of the client profile data on a pop-up note on a call screen of the first mobile device, wherein the call screen of the first mobile device provides a user interface that allows for a user to reject the incoming call or accept the incoming call and open the mobile application,
wherein the first mobile device comprises an optical sensor, wherein the optical sensor is configured to scan vehicle identification numbers, business cards, and driver's licenses,
wherein the client profile data comprises at least one of data relating to whether the client is a new client, data relating to whether the client has performed a test drive, data relating to whether the salesman can provide an initial quote on the car's price, data relating to whether the client has negotiated with any salesmen, and data relating to whether the client has come to an agreement on a price,
wherein retrieving the client profile data is via at least one of a wide area network, a local area network, a remote server comprising the remote server database, wherein the remote server is configured to send the fourth subset of the client profile data to the first mobile device if the fourth subset of the client profile data is found, and an external server comprising an external server database, wherein the external server database is configured to store a fifth subset of the client profile data, wherein the external server is configured to send the fifth subset of the client profile data to the remote server if the fifth subset of the client profile data is found, and wherein the remote server is configured to send the fifth subset of the client profile data from the external server to the first mobile device.

16. The method of claim 15, wherein the client profile data comprises a make of a car.

17. The method of claim 15, further comprising requesting a search for the fifth subset of the client profile data from the external server database wirelessly connected to the remote server database.

18. The method of claim 17, further comprising displaying the fifth subset of the client profile data on the first mobile device if the fifth subset of the client profile data is found on the external server database.

19. The method of claim 15, wherein displaying the display subset of the client profile data on the pop-up note on the call screen is for the duration of the call.

20. The method of claim 15, wherein displaying the display subset of the client profile data on the pop-up note on a call screen is for at least 30 seconds.

* * * * *